(12) United States Patent
Kita

(10) Patent No.: US 12,425,541 B2
(45) Date of Patent: Sep. 23, 2025

(54) DISPLAY DEVICE

(71) Applicant: Toshiyuki Kita Design Laboratory Ltd., Osaka (JP)

(72) Inventor: Toshiyuki Kita, Osaka (JP)

(73) Assignee: TOSHIYUKI KITA DESIGN LABORATORY LTD., Osaka (JP)

( * ) Notice: Subject to any disclaimer, the term of this patent is extended or adjusted under 35 U.S.C. 154(b) by 230 days.

(21) Appl. No.: 18/011,904

(22) PCT Filed: Jul. 5, 2021

(86) PCT No.: PCT/JP2021/025274
§ 371 (c)(1),
(2) Date: Dec. 21, 2022

(87) PCT Pub. No.: WO2022/009826
PCT Pub. Date: Jan. 13, 2022

(65) Prior Publication Data
US 2023/0247176 A1    Aug. 3, 2023

(30) Foreign Application Priority Data

Jul. 9, 2020 (JP) ................................ 2020-118300

(51) Int. Cl.
*H04N 7/14* (2006.01)
*F16M 11/04* (2006.01)
(Continued)

(52) U.S. Cl.
CPC ........... *H04N 7/147* (2013.01); *F16M 11/046* (2013.01); *F16M 11/10* (2013.01); *G06F 3/011* (2013.01);
(Continued)

(58) Field of Classification Search
None
See application file for complete search history.

(56) References Cited

U.S. PATENT DOCUMENTS 8,364,662 B1 *   1/2013  Moyer .................. G06F 16/958
                                                          707/706
10,986,311 B1 *  4/2021  Noland .................. G06V 40/10
                        (Continued)

FOREIGN PATENT DOCUMENTS

JP    2018-084775    5/2018
JP    2018-131267    8/2018
            (Continued)

OTHER PUBLICATIONS

WO 2020/017757 A1 Cho, S Display Device, Jan. 23, 2020 pp. 24 English translation (Year: 2020).*

*Primary Examiner* — Duc Nguyen
*Assistant Examiner* — Assad Mohammed
(74) *Attorney, Agent, or Firm* — Millen, White, Zelano & Branigan; Christopher W. Brody

(57) ABSTRACT

A display device has a digital camera that captures a user facing a front panel installed on an extension member. The display device includes a communication means capable of transmitting and receiving predetermined data to and from another server using the Internet, an image capturing means that captures the user using the digital camera, an image data transmission means that transmits image data of the user captured by the capturing means to another server using the communication means, an image data reception means that receives image data of a third party facing the user via the display device from the another server using the communication means, and an image data output means that outputs an image of the third party received by the image data reception means to the front panel. The display device can bidirectionally transmit/receive image data, acquire and/or provide various types of image information from/to another server.

13 Claims, 20 Drawing Sheets

(51) Int. Cl.
  *F16M 11/10*     (2006.01)
  *G06F 3/01*      (2006.01)
  *H04N 21/422*    (2011.01)
  *H04N 21/4782*   (2011.01)
  *F16M 11/18*     (2006.01)

(52) U.S. Cl.
  CPC ... *H04N 21/42203* (2013.01); *H04N 21/4782* (2013.01); *F16M 11/18* (2013.01); *F16M 2200/08* (2013.01)

(56) References Cited

U.S. PATENT DOCUMENTS

| | | | |
|---|---|---|---|
| 11,227,060 B1* | 1/2022 | John | G06F 21/606 |
| 2003/0109286 A1 | 6/2003 | Hack et al. | |
| 2007/0064379 A1* | 3/2007 | Shin | F16M 11/2064 |
| | | | 361/679.06 |
| 2007/0089343 A1 | 4/2007 | Goldman | |
| 2010/0182763 A1 | 7/2010 | Takahashi et al. | |
| 2010/0283829 A1* | 11/2010 | De Beer | H04M 3/56 |
| | | | 348/14.09 |
| 2014/0324412 A1 | 10/2014 | Itamoto | |
| 2014/0362164 A1 | 12/2014 | Nakamura et al. | |
| 2015/0192967 A1* | 7/2015 | Kano | H04N 21/44218 |
| | | | 345/650 |
| 2018/0278431 A1* | 9/2018 | Yoon | H04N 21/4316 |
| 2018/0320869 A1* | 11/2018 | Yu | F21L 14/02 |
| 2019/0386844 A1* | 12/2019 | Takahashi | G06F 3/167 |
| 2020/0089851 A1* | 3/2020 | Kumar Agrawal | G06V 20/52 |
| 2020/0097091 A1 | 3/2020 | Chou et al. | |
| 2020/0326582 A1 | 10/2020 | Azuma et al. | |

FOREIGN PATENT DOCUMENTS

| | | | |
|---|---|---|---|
| WO | 2016/174784 | 11/2016 | |
| WO | WO-2020017757 A1 * | 1/2020 | G02F 1/133305 |

* cited by examiner

DISPLAY DEVICE

TECHNICAL FIELD

The present invention relates to a display device that outputs a predetermined image to a front panel.

BACKGROUND ART

An interactive display system is disclosed that has a processing device, a camera configured to be connected to the processing device and generate a plurality of images in the processing device, a display device configured to be connected to the processing device and display a first scene output by the processing device, and a memory device configured to be connected to the processing device and store a process of an interactive display, and instruct the processing device to perform the process of the interactive display, the interactive display system including a determination means that determines a plurality of gestures corresponding to a plurality of images captured by the camera, an interpretation means that interprets a predetermined combination of gestures of the plurality of gestures as a first command, and a scene output means that outputs a first scene in response to the first command (see Patent Literature 1). The interactive display system can detect a predefined combination of gestures performed by a user, instruct the interactive display system to respond to the user, and allow the user to interact with the interactive display system without inputting data to an input device.

CITATION LIST

Patent Literature

Patent Literature 1: JP 2020-52991 A

SUMMARY OF INVENTION

Technical Problem

Since the interactive display system disclosed in Patent Literature 1 does not transmit the image data captured by the camera or the audio data collected by the microphone to another server, the image captured by the camera cannot be output to (displayed on) the display of another server, and the voice collected by the microphone cannot be output from the speaker of another server. In addition, since the predetermined image data is not received from another server, the image received from another server cannot be output to (displayed on) the display, and since the predetermined audio data is not received from another server, the voice received from another server cannot be output (displayed) from the speaker. The interactive display system cannot acquire various types of image information and audio information from another server (third party), and cannot provide various types of image information and audio information to another server (third party). Furthermore, since the display does not rotate about the center thereof in a clockwise direction and a semi-clockwise direction, the display does not move upward and downward in a vertical direction, and the display does not rotate about the support rod thereof in a counterclockwise direction and a clockwise direction of the support rod, the display cannot be automatically moved to a position where the user can see the display most easily, and the display cannot be brought into a state where the user can see the display most easily regardless of the position of the user.

An object of the present invention is to provide a display device capable of bidirectionally transmitting and receiving image data and audio data, capable of acquiring various types of image information and audio information from another server (third party), and capable of providing various types of image information and audio information to another server (third party). Another object of the present invention is to provide a display device capable of automatically moving a front panel to a position where the user can see the front panel most easily and capable of bringing the front panel into a state where the user can see the front panel most easily, regardless of the position of the user.

Solution to Problem

The premise of the present invention for solving the above problems is a display device that includes first and second end edges extending in one direction in parallel with each other, first and second side edges extending in an intersecting direction intersecting the one direction in parallel with each other, and a front panel and a back surface area surrounded by the end edges and the side edges, that is molded into a rectangle with a predetermined area long in the one direction or the intersecting direction, and outputs a predetermined image to the front panel.

According to the present invention in the above premise, the display device including a first extension portion with a predetermined area including a first outer peripheral edge defining an arc so as to project radially outward from the first end edge, a second extension portion with a predetermined area including a second outer peripheral edge defining an arc so as to project radially outward from the second end edge, a third extension portion with a predetermined area including a third outer peripheral edge defining an arc so as to project radially outward from the first side edge, a fourth extension portion with a predetermined area including a fourth outer peripheral edge defining an arc so as to project radially outward from the second side edge, and a camera that captures an object facing the front panel and is installed in at least one of the first to fourth extension portions, and the display device further including a communication means capable of transmitting and receiving predetermined data to and from another server using a predetermined network, an image capturing means that captures the object using the camera, an image data transmission means that transmits image data of an object captured by the capturing means to another server using the communication means, an image data reception means that receives image data of an object facing the user via the display device from the another server using the communication means, and an image data output means that outputs an image of an object received by the image data reception means to the front panel.

As an example of the present invention, an object captured by the camera is a user of the display device, an object facing the user via the display device is a third party interacting with the user via the display device, the capturing means captures the user using the camera, the image data transmission means transmits image data of the user captured by the capturing means to another server using the communication means, the image data reception means receives image data of the third party from the another server using the communication means, and the image data output means outputs an image of the third party received by the image data reception means to the front panel.

As another example of the present invention, the display device further including a microphone that collects voice of a user facing a front panel of the display and is installed in at least one of the first to fourth extension portions, a speaker that emits a predetermined sound and is installed in at least one of the first to fourth extension portions, a voice collection means that collects voice of the user using the microphone, an audio data transmission means that transmits audio data of the user collected by the voice collection means to another server using the communication means, an audio data reception means that receives audio data of a third party interacting with the user via the display device from the another server using the communication means, and a voice output means that outputs voice of the third party received by the audio data reception means using the speaker.

As another example, the display device further including a website introduction information reception means that, in a case where a request emitted by the user is collected by the voice collection means, receives website introduction information of a plurality of various types of websites corresponding to the request with the request as a keyword from another server using the communication means, a website introduction information output means that outputs website introduction information received by the website introduction information reception means to the front panel, and a website output means that, when a predetermined website is designated from a plurality of various types of websites output by the website introduction information output means, outputs a designated website to the front panel.

As another example of the present invention, the display device further including a request-related information reception means that, in a case where a request emitted by the user is collected by the voice collection means, receives various types of request-related information related to the request with the request as a keyword from another server using the communication means, and a request-related information output means that outputs request-related information received by the request-related information reception means to the front panel.

As another example of the present invention, the display device further including a translation means that translates voice emitted by the user and voice of a third party received from another server into a predetermined language, and a translated voice output means that outputs the voice of the user and the voice of the third party translated by the translation means using the speaker.

As another example of the present invention, the display device further including a process performance means that, in a case where the user inputs, via the display device, a command to cause a predetermined electrical apparatus to perform a predetermined process by an IOT, transmits a predetermined process corresponding to the command to the electrical apparatus using the communication means, and causes the electrical apparatus to perform the predetermined process.

As another example of the present invention, the display device further including a human sensor that detects a person when the person is positioned in front of the front panel and is installed in at least one of the first to fourth extension portions, a display first activation means that activates the display device in a case where the human sensor detects the person, and a display first stop means that stops the display device activated in a case where the human sensor detects the person and then the person is no longer detected.

As another example of the present invention, the display device further including an image data first comparison means that, after the display device is activated by the display first activation means, captures a person positioned in front of the front panel by the capturing means and compares image data of a captured person with image data of the user stored in advance, wherein in a case where an image of the captured person is different from an image of the user stored as a result of comparing the image of the captured person with the image of the user stored by the image data first comparison means, the display first stop means is implemented.

As another example of the present invention, the display device further including a voice first comparison means that, in a case where an activation message emitted by the user is collected by the voice collection means, compares voice of the activation message collected of the user with voice of the user stored in advance, a display second activation means that activates the display device in a case where the voice of the activation message is same as the voice of the user stored as a result of comparing the voice of the activation message with the voice of the user stored by the voice first comparison means, and a display second stop means that stops the display device activated in a case where a stop message emitted by the user is collected by the voice collection means.

As another example of the present invention, the display device further including an illumination lamp that illuminates front of the front panel and is installed in at least one of the first to fourth extension portions, a light detection sensor that detects light around the display device and is installed in at least one of the first to fourth extension portions, an illumination-lamp first activation means that, in a case where the human sensor detects the person and the light detection sensor does not sense light around the display device, activates the illumination lamp, and an illumination-lamp first turn-off means that, in a case where the human sensor does not detect the person or the light detection sensor detects light around the display device, turns off the illumination lamp activated.

As another example of the present invention, the display device further including an image data second comparison means that, after the illumination lamp is activated by the illumination-lamp first activation means, captures a person positioned in front of the front panel by the capturing means and compares image data of a captured person with image data of the user stored in advance, wherein in a case where an image of the captured person is different from the image of the user stored as a result of comparing the image of the captured person with the image of the user stored by the image data second comparison means, the illumination-lamp first stop means is implemented.

As another example of the present invention, the display device further including a voice second comparison means that, in a case where an illumination-lamp activation message emitted by the user is collected by the voice collection means, compares voice of the activation message collected of the user with voice of the user stored in advance, an illumination-lamp second activation means that activates the illumination lamp in a case where the voice of the activation message is same as the voice of the user stored as a result of comparing the voice of the activation message with the voice of the user stored by the voice second comparison means, and an illumination-lamp second turn-off means that turns off the illumination lam activated in a case where an illumination-lamp stop message emitted by the user is collected by the voice collection means.

As another example of the present invention, the display device further including a support rod that is installed in the back surface area and extends in a vertical direction, wherein the display device is capable of moving upward and downward in the vertical direction along the support rod, capable of rotating in a clockwise direction and a counterclockwise direction about the support rod, and capable of turning in a clockwise direction and a semi-clockwise direction about a central portion of the display device, and the display device further including an adaptability estimation means that, by inputting image data of a face of the user captured by the image capturing means to a learned learning model that has performed machine learning for estimating a degree of adaptability of a face posture of the user visually recognizing the front panel, acquires an adaptability score indicating the degree of adaptability of the face posture of the user visually recognizing the front panel from the learned learning model, and a display movable means that automatically moves up and down, rotates, or turns the display device in such a manner that the adaptability score acquired by the adaptability estimation means satisfies a predetermined condition.

Advantageous Effects of Invention

The display device according to the present invention includes a first extension portion with a predetermined area including a first outer peripheral edge defining an arc so as to project radially outward from the first end edge, a second extension portion with a predetermined area including a second outer peripheral edge defining an arc so as to project radially outward from the second end edge, a third extension portion with a predetermined area including a third outer peripheral edge defining an arc so as to project radially outward from the first side edge, a fourth extension portion with a predetermined area including a fourth outer peripheral edge defining an arc so as to project radially outward from the second side edge, and a camera that captures an object facing the front panel and is installed in at least one of the first to fourth extension portions, and the display device further includes a communication means capable of transmitting and receiving predetermined data to and from another server using a predetermined network, an image capturing means that captures the object using the camera, an image data transmission means that transmits image data of an object captured by the capturing means to another server using the communication means, an image data reception means that receives image data of an object facing the user via the display device from the another server using the communication means, and an image data output means that outputs an image of an object received by the image data reception means to the front panel. Therefore, by transmitting the image data of the object captured by the camera to another server using the communication means and receiving the image data of the object from another server using the communication means, the display device can bidirectionally transmit and receive the image data of a predetermined object to and from another server, acquire and output (display) various types of image information from another server (third party), and provide various types of image information to another server (third party).

According to the display device, an object captured by the camera is a user of the display device, an object facing the user via the display device is a third party interacting with the user via the display device, the capturing means captures the user using the camera, the image data transmission means transmits image data of the user captured by the capturing means to another server using the communication means, the image data reception means receives image data of the third party from the another server using the communication means, and the image data output means outputs an image of the third party received by the image data reception means to the front panel. Therefore, by transmitting the image data of the user captured by the camera to another server using the communication means and receiving the image data of the third party from another server using the communication means, the display device can bidirectionally transmit and receive the image data of the user and the third party to and from another server, acquire and output (display) the image information of the third party from another server (third party), and provide the image information of the user to another server (third party).

The display device further includes a microphone that collects voice of a user facing a front panel of the display and is installed in at least one of the first to fourth extension portions, a speaker that emits a predetermined sound and is installed in at least one of the first to fourth extension portions, a voice collection means that collects voice of the user using the microphone, an audio data transmission means that transmits audio data of the user collected by the voice collection means to another server using the communication means, an audio data reception means that receives audio data of a third party interacting with the user via the display device from the another server using the communication means, and a voice output means that outputs (emits) voice of the third party received by the audio data reception means using the speaker. Therefore, by transmitting the audio data of the user collected by the microphone to another server using the communication means and receiving the audio data of the third party from another server using the communication means, the display device can bidirectionally transmit and receive the audio data of the user and the third party to and from another server, acquire and output (display) various types of audio information from another server (third party), and provide various types of audio information to another server (third party).

The display device further includes a website introduction information reception means that, in a case where a request emitted by the user is collected by the voice collection means, receives website introduction information of a plurality of various types of websites corresponding to the request with the request as a keyword from another server using the communication means, a website introduction information output means that outputs website introduction info lotion received by the website introduction information reception means to the front panel, and a website output means that, when a predetermined website is designated from a plurality of various types of websites output by the website introduction information output means, outputs a designated website to the front panel. By outputting (displaying) the website introduction information of the plurality of various types of websites corresponding to the request emitted by the user to the front panel, the display device can output (display) the website introduction information desired by the user to the front panel only by voice, output (display) the designated website to the front panel, and the user can obtain various types of information useful for the user by checking the desired website requested by voice.

The display device further includes a request-related information reception means that, in a case where a request emitted by the user is collected by the voice collection means, receives various types of request-related information related to the request with the request as a keyword from another server using the communication means, and a request-related information output means that outputs request-related information received by the request-related information reception means to the front panel. Therefore, by outputting (displaying) various types of request-related information related to the request emitted by the user to the front panel, the display device can output (display) various types of request-related information desired by the user to the front panel only by voice, and the user can obtain various types of information useful for the user by checking the desired request-related information requested by voice.

The display device further includes a translation means that translates voice emitted by the user and voice of a third party received from another server into a predetermined language, and a translated voice output means that outputs the voice of the user and the voice of the third party translated by the translation means using the speaker. Since the display device translates the voice of the user and the voice of the third party into a predetermined language and outputs the translated voice of the user and the translated voice of the third party using the speaker, the display device enables communication with a foreign person using a different language through interaction, transmission of various types of information useful for a third party in another country, and acquisition of various types of useful information from the third party in another country.

The display device further includes a process performance means that, in a case where the user inputs, via the display device, a command to cause a predetermined electrical apparatus to perform a predetermined process by an IOT, transmits a predetermined process corresponding to the command to the electrical apparatus using the communication means, and causes the electrical apparatus to perform the predetermined process. Since the display device causes the electrical apparatus to perform the predetermined process corresponding to the command by the IOT the display device can cause the electrical apparatus to perform various types of processes desired by the user by the IOT and operate the electrical apparatus by remote control using the IOT.

The display device further includes a human sensor that detects a person when the person is positioned in front of the front panel and is installed in at least one of the first to fourth extension portions, a display first activation means that activates the display device in a case where the human sensor detects the person, and a display first stop means that stops the display device activated in a case where the human sensor detects the person and then the person is no longer detected. Therefore, in a case where the human sensor detects the presence or absence of a person in front of the front panel and detects a person, the display device can be automatically activated, and in a case where the human sensor no longer detects a person, the activated display device can be automatically stopped, and the activation and stop of the display device can be automatically performed using the human sensor.

The display device further includes an image data first comparison means that, after the display device is activated by the display first activation means, captures a person positioned in front of the front panel by the capturing means and compares image data of a captured person with image data of the user stored in advance, and in a case where an image of the captured person is different from an image of the user stored as a result of comparing the image of the captured person with the image of the user stored by the image data first comparison means, the display first stop means is implemented. In a case where the user of the display device is different from the captured person, the activated display device is stopped, and thus the display device can be used only by a valid user, and unauthorized use of the display device can be prevented.

The display device further includes a voice first comparison means that, in a case where an activation message emitted by the user is collected by the voice collection means, compares voice of the activation message collected of the user with voice of the user stored in advance, a display second activation means that activates the display device in a case where the voice of the activation message is same as the voice of the user stored as a result of comparing the voice of the activation message with the voice of the user stored by the voice first comparison means, and a display second stop means that stops the display device activated in a case where a stop message emitted by the user is collected by the voice collection means. In a case where the voice of the activation message is compared with the stored voice of the user and the voice of the activation message is the same as the stored voice of the user, the display device is activated. Therefore, not only the display device can be activated only by the voice of the user, but also the display device is not activated in a case where the voice of the activation message is different from the stored voice of the user, so that the display device can be used only by a valid user, and unauthorized use of the display device can be prevented. The display device can be automatically stopped by the stop message emitted by the user, and the activation and stop of the display device can be automatically performed by the voice of the user.

The display device further includes an illumination lamp that illuminates front of the front panel and is installed in at least one of the first to fourth extension portions, a light detection sensor that detects light around the display device and is installed in at least one of the first to fourth extension portions, an illumination-lamp first activation means that, in a case where the human sensor detects the person and the light detection sensor does not sense light around the display device, activates the illumination lamp, and an illumination-lamp first turn-off means that, in a case where the human sensor does not detect the person or the light detection sensor detects light around the display device, turns off the illumination lamp activated. Therefore, in a case where the human sensor detects the presence or absence of a person in front of the front panel and detects a person, when the light detection sensor detects light around the display device and does not sense light, the display device can automatically activate the illumination lamp, and when the human sensor does not detects a person or when the light detection sensor senses light, the display device can automatically turn off the activated illumination lamp, and the activation and stop of the illumination lamp can be automatically performed using the human sensor and the light detection sensor.

The display device further includes an image data second comparison means that, after the illumination lamp is activated by the illumination-lamp first activation means, captures a person positioned in front of the front panel by the capturing means and compares image data of a captured person with image data of the user stored in advance, and in a case where an image of the captured person is different from the image of the user stored as a result of comparing the image of the captured person with the image of the user stored by the image data second comparison means, the illumination-lamp first stop means is implemented. In a case where the user of the display device is different from the captured person, the activated illumination lamp is stopped, and thus the display device including the illumination lamp can be used only by a valid user, and unauthorized use of the display device including the illumination lamp can be prevented.

The display device further includes a voice second comparison means that, in a case where an illumination-lamp activation message emitted by the user is collected by the voice collection means, compares voice of the activation message collected of the user with voice of the user stored in advance, an illumination-lamp second activation means that activates the illumination lamp in a case where the voice of the activation message is same as the voice of the user stored as a result of comparing the voice of the activation message with the voice of the user stored by the voice second comparison means, and an illumination-lamp second turn-off means that turns off the illumination lamp activated in a case where an illumination-lamp stop message emitted by the user is collected by the voice collection means. The display device compares the voice of the activation message with the voice of the user stored, and activates the illumination lamp in a case where the voice of the activation message is the same as the voice of the user stored. Therefore, not only the illumination lamp can be activated only by the voice of the user, but also the illumination lamp is not activated in a case where the voice of the activation message is different from the voice of the user stored, so that the display device including the illumination lamp can be used only by a valid user, and unauthorized use of the display device including the illumination lamp can be prevented. The display device can automatically stop the illumination lamp by the stop message emitted by the user, and the activation and stop of the illumination lamp can be automatically performed by the voice of the user.

The display device further includes a support rod that is installed in the back surface area and extends in a vertical direction, wherein the display device is capable of moving upward and downward in the vertical direction along the support rod, capable of rotating in a clockwise direction and a counterclockwise direction about the support rod, and capable of turning in a clockwise direction and a semi-clockwise direction about a central portion of the display device, and the display device further includes an adaptability estimation means that, by inputting image data of a face of the user captured by the image capturing means to a learned learning model that has performed machine learning for estimating a degree of adaptability of a face posture of the user visually recognizing the front panel, acquires an adaptability score indicating the degree of adaptability of the face posture of the user visually recognizing the front panel from the learned learning model, and a display movable means that automatically moves up and down, rotates, or turns the display device in such a manner that the adaptability score acquired by the adaptability estimation means satisfies a predetermined condition. The display device automatically moves up and down, rotates, or turns in such a manner that the adaptability score acquired by the adaptability estimation means implemented by artificial intelligence, so that regardless of the position of the user, the display device can be automatically moved to a position where the user visually recognizing the front panel can see the display device most easily, and the front panel can be brought into a state where the user can see the front panel most easily.

DESCRIPTION OF EMBODIMENTS

Figure 1:
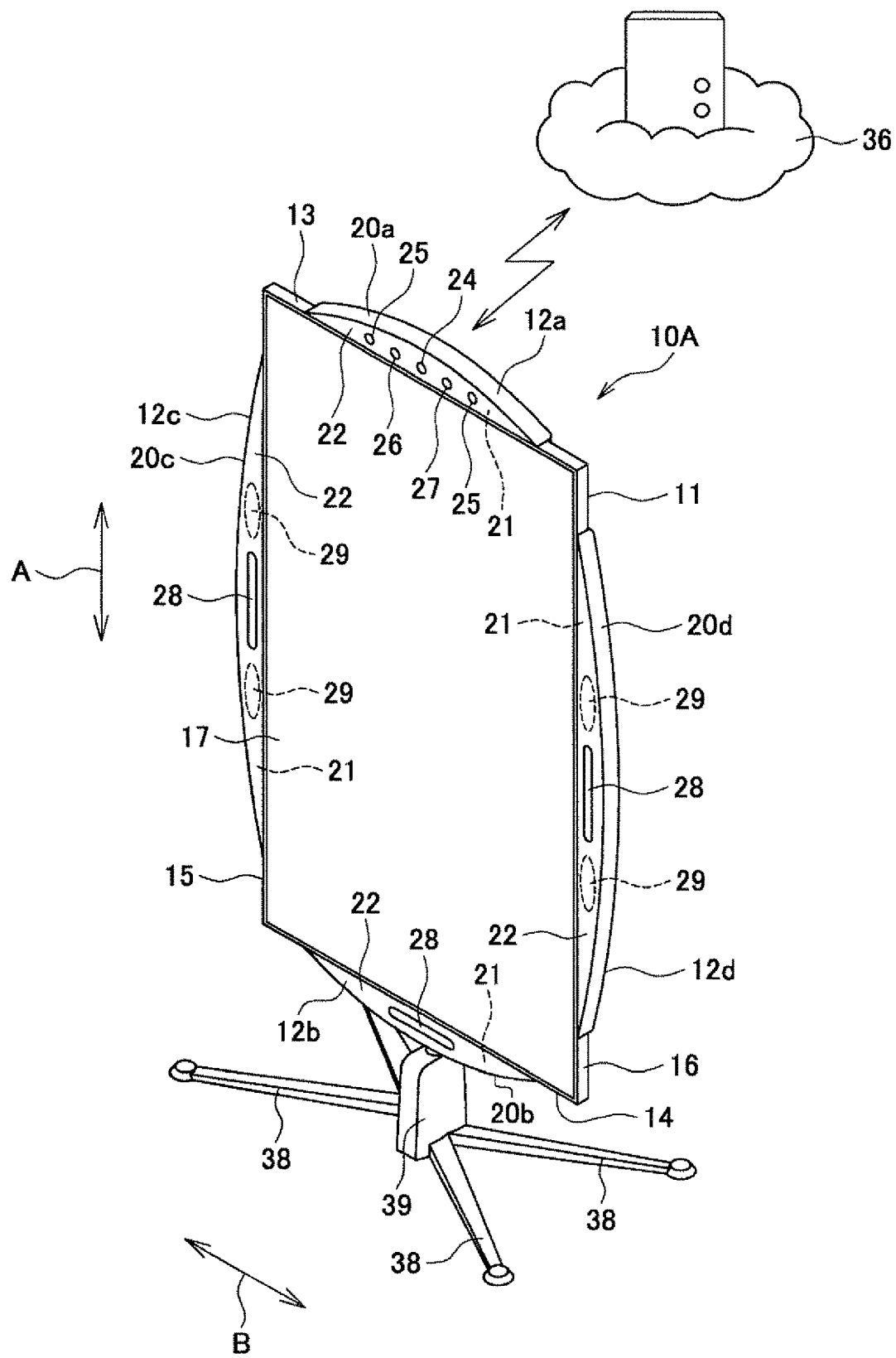
FIG. 1 is a perspective view of a display device illustrated as an example.
Figure 2:
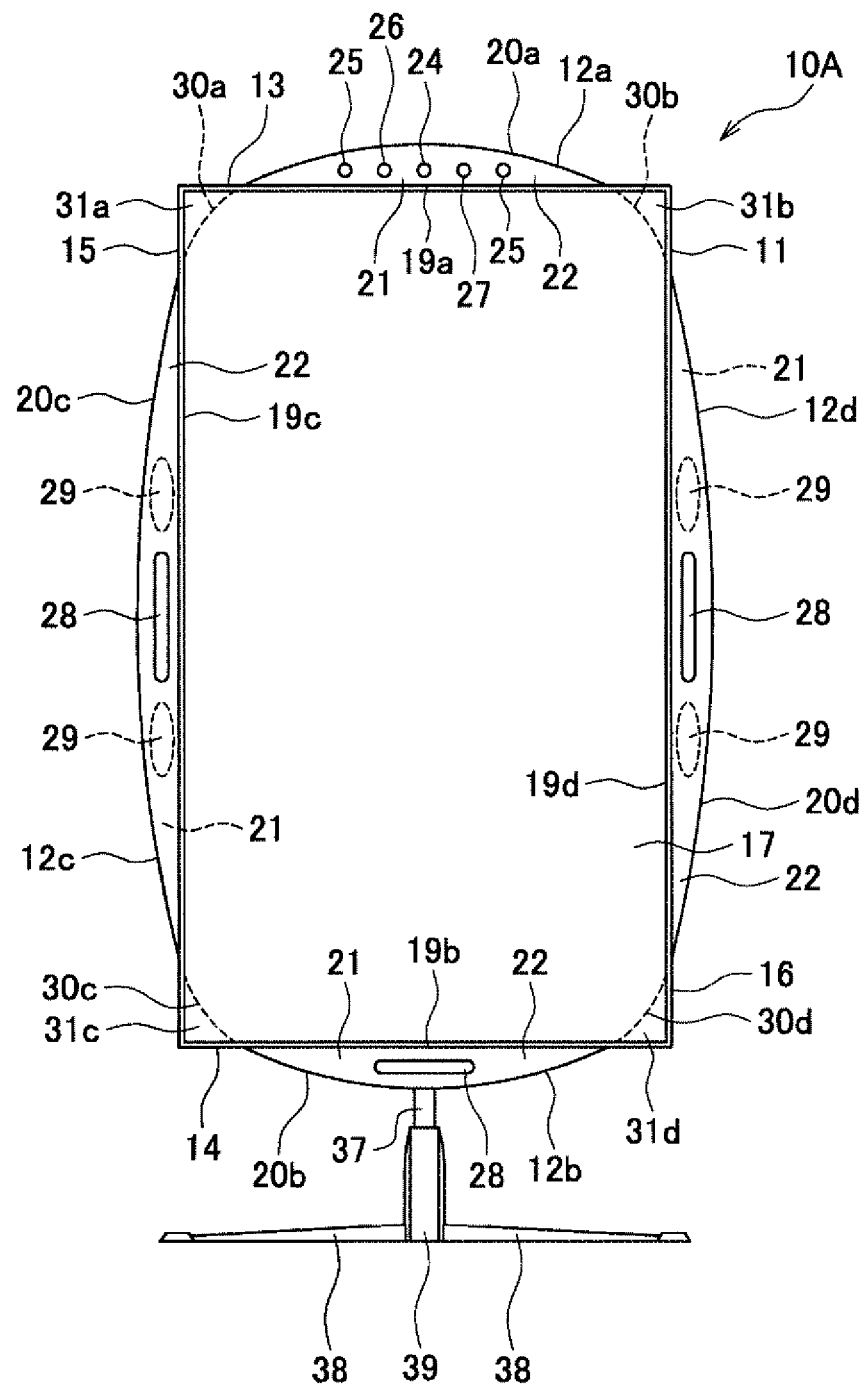
FIG. 2 is a front view of the display device illustrated in FIG. 1.
Figure 3:
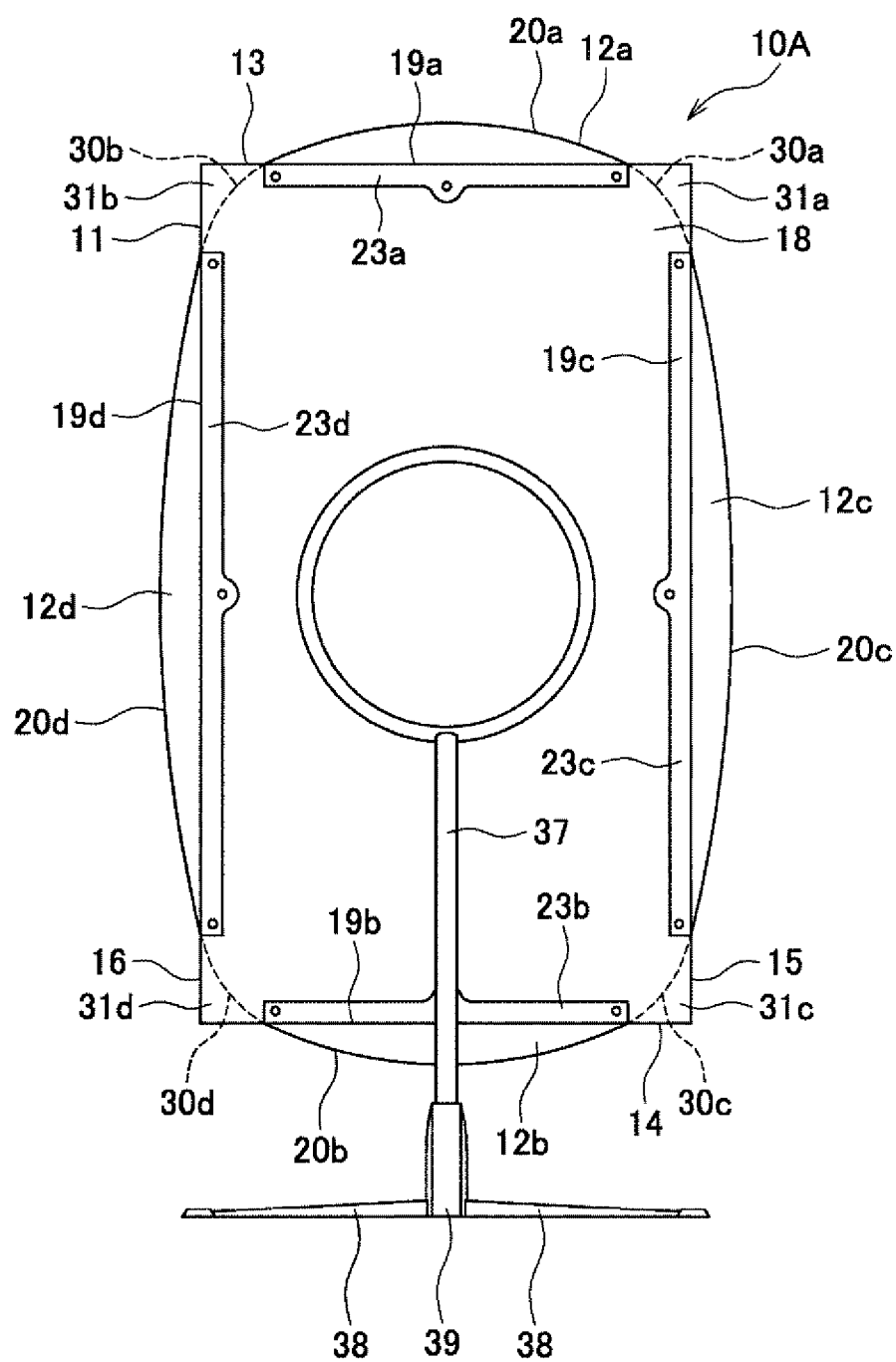
FIG. 3 is a rear view of the display device illustrated in FIG. 1.
Figure 4:
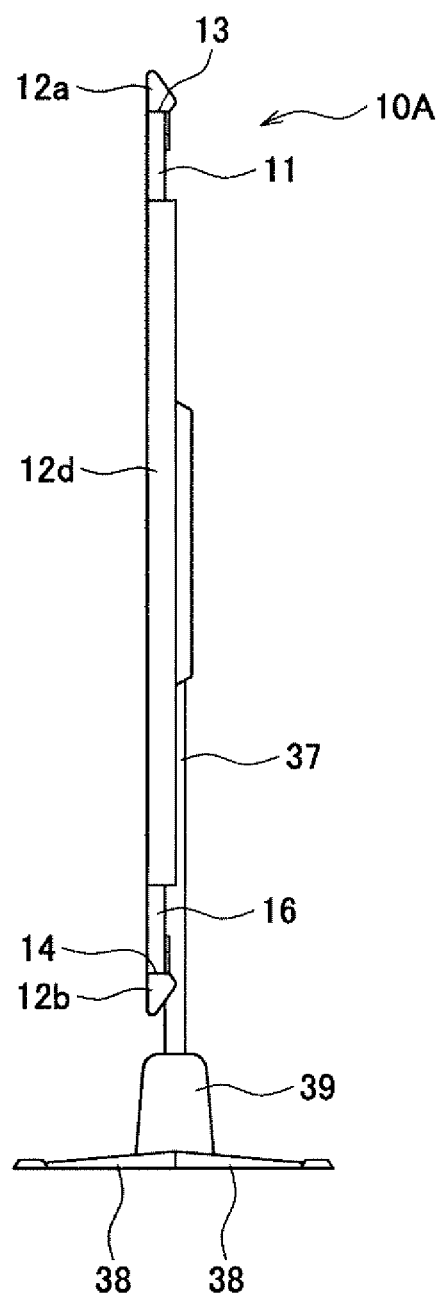
FIG. 4 is a side view of the display device illustrated in FIG. 1.
Figure 5:
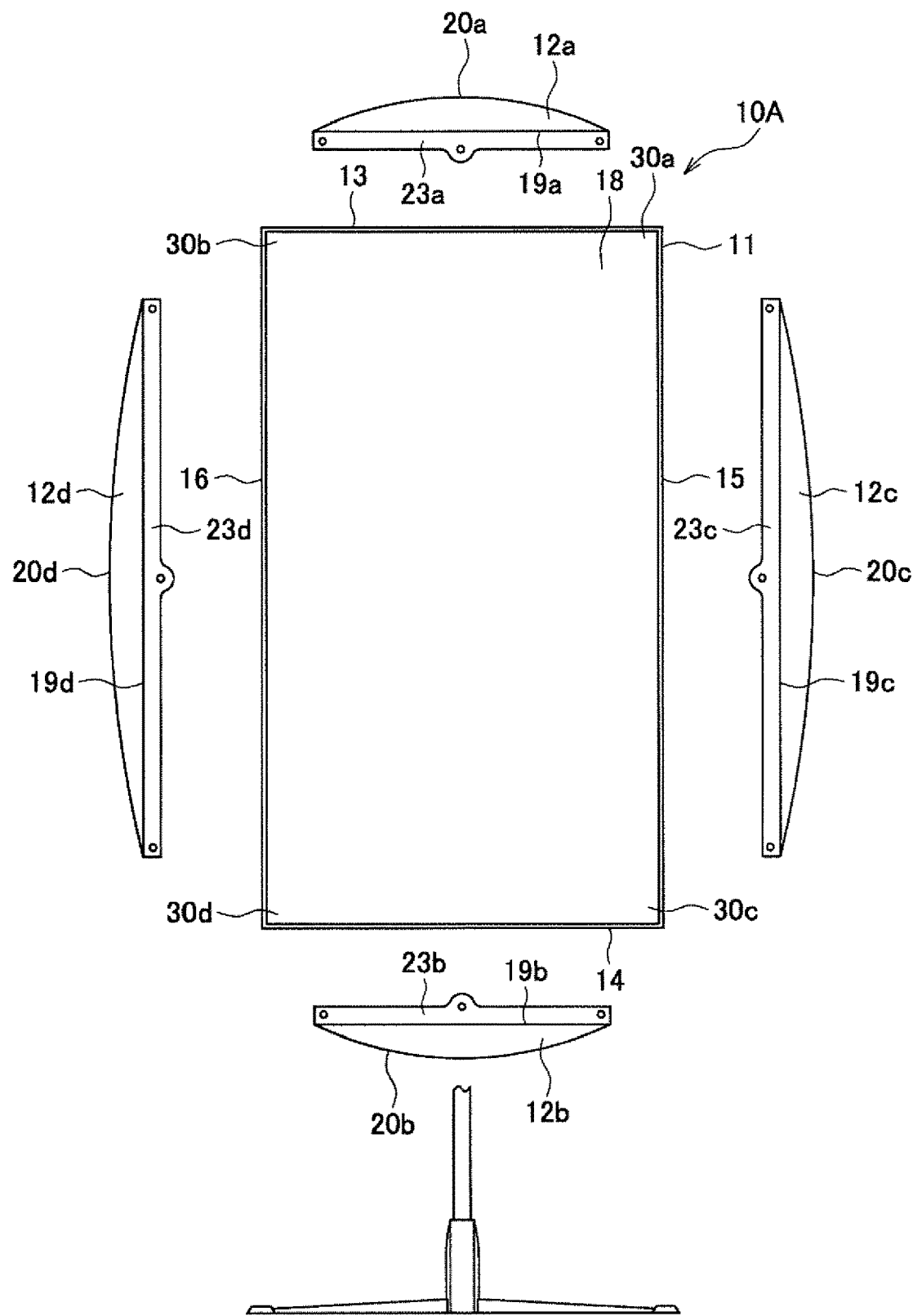
FIG. 5 is an exploded view illustrating a state where first to fourth extension members are removed from a display body.
Figure 6:
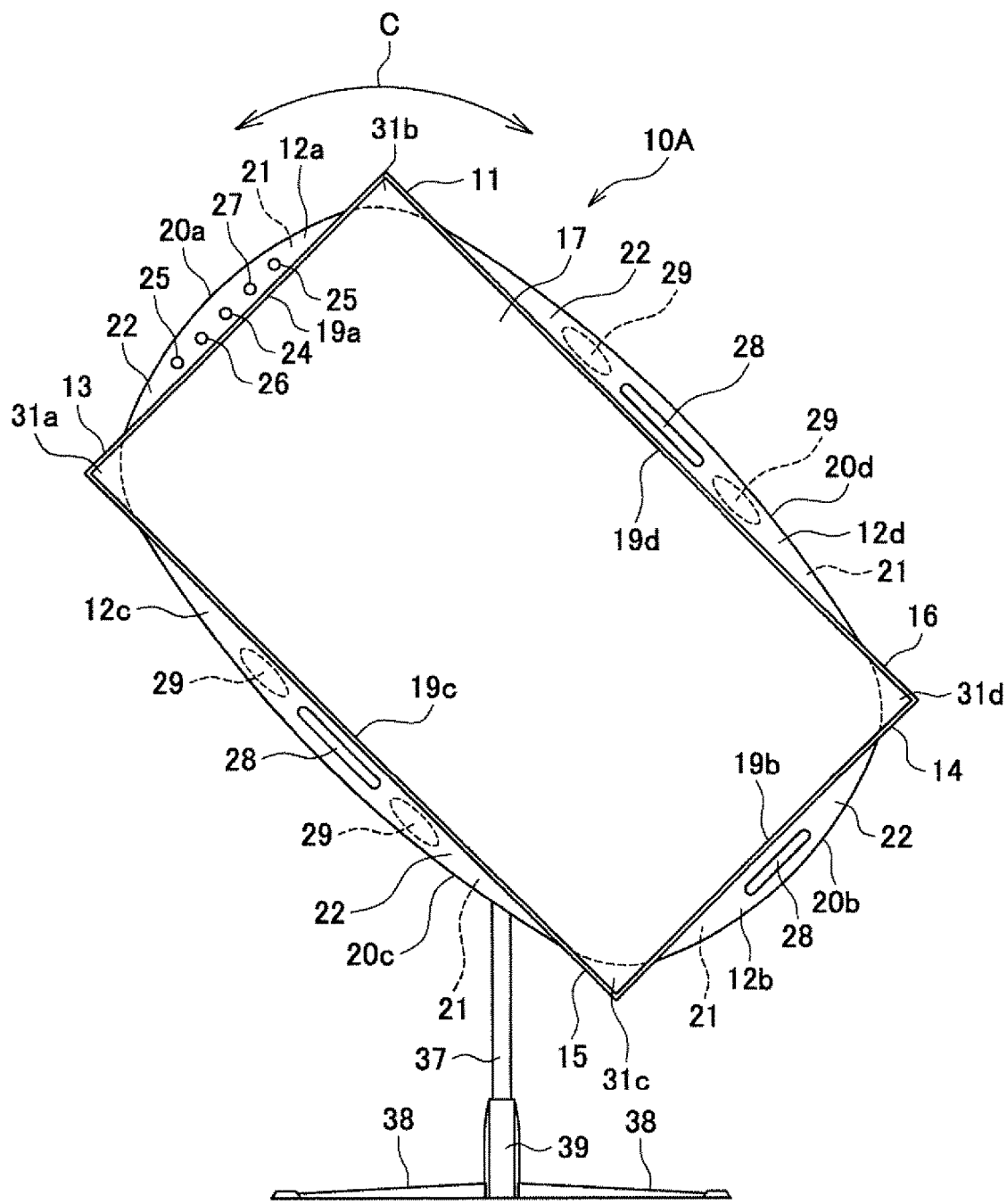
FIG. 6 is a front view illustrating a state where the display device turns in a clockwise direction or a semi-clockwise direction.
Figure 7:
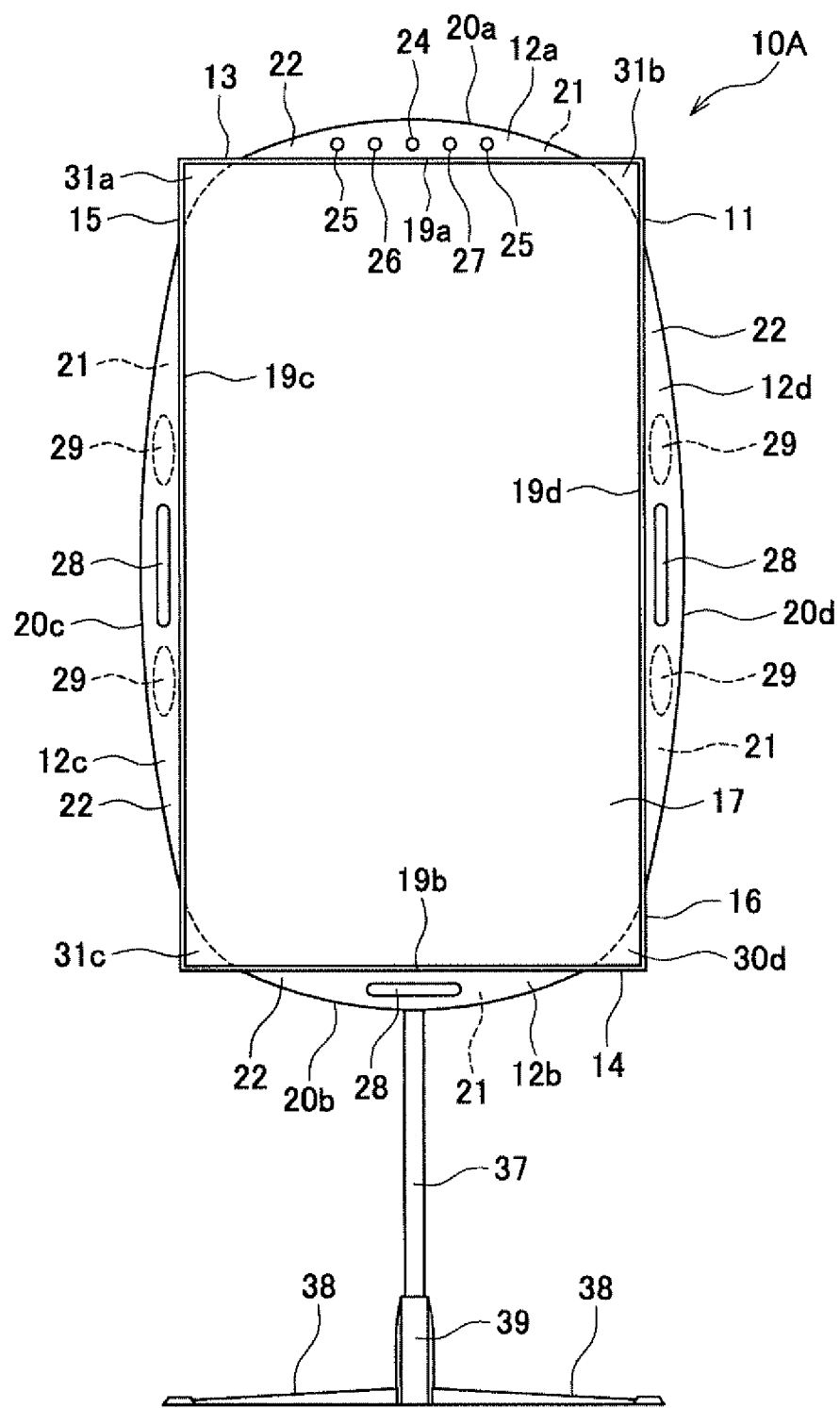
FIG. 7 is a front view illustrating a state where the display device moves upward in a vertical direction along a support rod.
Figure 8:
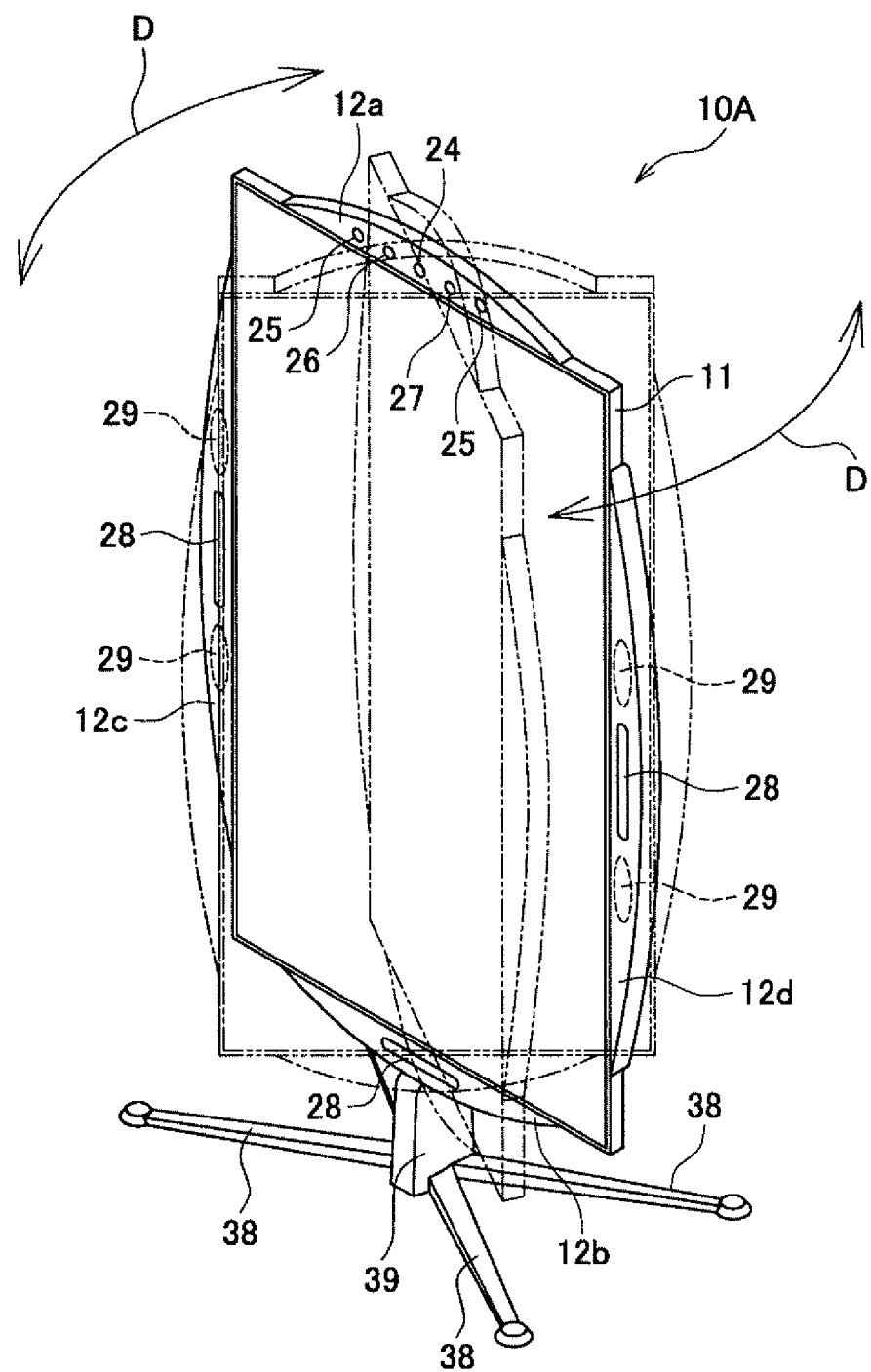
FIG. 8 is a view illustrating a state where the display device rotates about the support rod in a direction around the support rod.

Details of the display device according to the present invention will be described below with reference to the accompanying drawings such as FIG. 1, which is a perspective view of a display device 10A illustrated as an example. Note that FIG. 2 is a front view of the display device 10A illustrated in FIG. 1, and FIG. 3 is a rear view of the display device 10A illustrated in FIG. 1. FIG. 4 is a side view of the display device 10A illustrated in FIG. 1, and FIG. 5 is an exploded view illustrating a state where first to fourth extension members 12a to 12d are removed from the display device 10A. FIG. 6 is a front view illustrating a state where the display device 10A turns in a clockwise direction or a semi-clockwise direction, and FIG. 7 is a front view illustrating a state where the display device 10A moves upward in a vertical direction along a support rod 37. FIG. 8 is a view illustrating a state where the display device 10A rotates about the support rod 37 in a direction around the support rod 37. In FIG. 1, the vertical direction is indicated by an arrow A, and the width direction is indicated by an arrow B. In FIG. 6, the turning direction is indicated by an arrow C, and in FIG. 8, the rotation direction is indicated by an arrow D.

The display device 10A (display system) includes a display body 11 and the first to fourth extension members 12a to 12d (first to fourth extension portions) attached to the display body 11. The display body 11 includes a first end edge 13 and a second end edge 14 extending in the width direction (one direction) in parallel with each other, a first side edge 15 and a second side edge 16 extending in the vertical direction (intersecting direction) intersecting with the width direction (one direction) in parallel with each other, and a front panel 17 and a back surface area 18 surrounded by the end edges 13 and 14 and the side edges 15 and 16. The display body 11 (front panel 17 and back surface area 18) is molded into a rectangle with a predetermined area long in the vertical direction (intersecting direction). Note that the display body 11 (front panel 17 and back surface area 18) may be molded into a rectangle with a predetermined area long in the width direction (one direction). A predetermined image is output to (displayed on) the front panel 17 of the display body 11. A controller (control device) (not illustrated) is housed in the display body 11.

The first extension member 12a (first extension portion) is detachably attached to the first end edge 13 of the display body 11. The first extension member 12a includes a first inner peripheral edge 19a extending in the width direction (one direction) in parallel with the first end edge 13, and a first outer peripheral edge 20a defining an arc so as to project upward in the vertical direction (radially outward) from the first inner peripheral edge 19a (first end edge 13). The first extension member 12a is molded into a crescent shape whose planar shape (front shape) is long in the width direction, and extends upward in the vertical direction (radially outward) from the first end edge 13 of the display body 11.

A device housing space (not illustrated) is formed inside the first extension member 12a. A front opening 21 of the first extension member 12a is covered with a cloth 22 (woven fabric or knitted fabric such as loudspeaker grill mesh). A first mounting plate 23a extending in the width direction (one direction) is integrally connected to the first inner peripheral edge 19a of the first extension member 12a. The first extension member 12a is disposed on the first end edge 13 of the display body 11 by fixing the first mounting plate 23a to the first end edge 13 of the display body 11 by a predetermined mounting means (mounting bolt, screw, or the like).

The device housing space of the first extension member 12a houses a digital camera 24 (camera), a microphone 25, a human sensor 26, and a light detection sensor 27. The control unit of the digital camera 24 is connected to a controller via an interface, and the lens is directed forward from the front opening 21 of the first extension member 12a to capture a user or an object positioned in front of the front panel 17. The control unit of the digital camera 24 transmits the captured image data to the controller. The microphone 25 is connected to the controller via the interface, and collects the voice of the user positioned in front of the front panel 17. The microphone 25 transmits the collected audio data to the controller.

The human sensor 26 is connected to the controller via the interface, and senses a person positioned in front of the front panel 17. The human sensor 26 transmits a human detection signal or a human non-detection signal to the controller. The light detection sensor 27 is connected to the controller via the interface and detects light around the display device 10A. The light detection sensor 27 transmits a light detection signal or a light non-detection signal to the controller.

The second extension member 12b (second extension portion) is detachably attached to the second end edge 14 of the display body 11. The second extension member 12b includes a second inner peripheral edge 19b extending in the width direction (one direction) in parallel with the second end edge 14, and a second outer peripheral edge 20b defining an arc so as to project downward in the vertical direction (radially outward) from the second inner peripheral edge 19b (second end edge 14). The second extension member 12b is molded into a crescent shape whose planar shape (front shape) is long in the width direction, and extends downward in the vertical direction (radially outward) from the second end edge 14 of the display body 11.

A device housing space (not illustrated) is formed inside the second extension member 12b. The front opening 21 of the second extension member 12b is covered with the cloth 22 (woven fabric or knitted fabric such as loudspeaker grill mesh). A second mounting plate 23b extending in the width direction (one direction) is integrally connected to the second inner peripheral edge 19b of the second extension member 12b. The second extension member 12b is disposed on the second end edge 14 of the display body 11 by fixing the second mounting plate 23b to the second end edge 14 of the display body 11 by a predetermined mounting means (mounting bolt, screw, or the like). An LED lamp 28 (illumination lamp) is housed in the device housing space of the second extension member 12b. The LED lamp 28 is connected to the controller via the interface and illuminates the front of the front panel 17.

The third extension member 12c (third extension portion) is detachably attached to the first side edge 15 of the display body 11. The third extension member 12c includes a third inner peripheral edge 19c extending in the width direction (one direction) in parallel with the first side edge 15, and a third outer peripheral edge 20c defining an arc so as to project outward in the width direction (radially outward) from the third inner peripheral edge 19c (first side edge 15). The third extension member 12c is molded into a crescent shape whose planar shape (front shape) is long in the vertical direction, and extends outward in the width direction (radially outward) from the first side edge 15 of the display body 11.

A device housing space (not illustrated) is formed inside the third extension member 12c. The front opening 21 of the third extension member 12c is covered with the cloth 22 (woven fabric or knitted fabric such as loudspeaker grill mesh). A third mounting plate 23c extending in the width direction (one direction) is integrally connected to the third inner peripheral edge 19c of the third extension member 12c. The third extension member 12c is disposed on the first side edge 15 of the display body 11 by fixing the third mounting plate 23c to the first side edge 15 of the display body 11 by a predetermined mounting means (mounting bolt, screw, or the like). A speaker 29, the LED lamp 28 (illumination lamp) are housed in the device housing space of the third extension member 12c. The speaker 29 is connected to the controller via the interface and generates a predetermined sound. The LED lamp 28 is connected to the controller via the interface and illuminates the front of the front panel 17.

The fourth extension member 12d (fourth extension portion) is detachably attached to the second side edge 16 of the display body 11. The fourth extension member 12d includes a fourth inner peripheral edge 19d extending in the width direction (one direction) in parallel with the second side edge 16, and a fourth outer peripheral edge 20d defining an arc so as to project outward in the width direction (radially outward) from the fourth inner peripheral edge 19d (second side edge 16). The fourth extension member 12d is molded into a crescent shape whose planar shape (front shape) is long in the vertical direction, and extends outward in the width direction (radially outward) from the second side edge 16 of the display body 11.

A device housing space (not illustrated) is formed inside the fourth extension member 12d. The front opening 21 of the fourth extension member 12d is covered with the cloth 22 (woven fabric or knitted fabric such as loudspeaker grill mesh). A fourth mounting plate 23d extending in the width direction (one direction) is integrally connected to the fourth inner peripheral edge 19d of the fourth extension member 12d. The fourth extension member 12d is disposed on the second side edge 16 of the display body 11 by fixing the fourth mounting plate 23d to the second side edge 16 of the display body 11 by a predetermined mounting means (mounting bolt, screw, or the like). The speaker 29, the LED lamp 28 (illumination lamp) are housed in the device housing space of the fourth extension member 12d. The speaker 29 is connected to the controller via the interface and generates a predetermined sound. The LED lamp 28 is connected to the controller via the interface and illuminates the front of the front panel 17.

In the display device 10A, the first outer peripheral edge 20a defining the arc of the first extension member 12a (first extension portion) and the third outer peripheral edge 20c defining the arc of the third extension member 12c (third extension portion) are connected at a first virtual intersecting peripheral edge 30a, and the first outer peripheral edge 20a defining the arc of the first extension member 12a and the fourth outer peripheral edge 20d defining the arc of the fourth extension member 12d (fourth extension portion) are connected at a second virtual intersecting peripheral edge 30b. Furthermore, the second outer peripheral edge 20b defining the arc of the second extension member 12b (second extension portion) and the third outer peripheral edge 20c defining the arc of the third extension member 12c are connected at a third virtual intersecting peripheral edge 30c, and the second outer peripheral edge 20b defining the arc of the second extension member 12b and the fourth outer peripheral edge 20d defining the arc of the fourth extension member 12d are connected at a fourth virtual intersecting peripheral edge 30d.

In the display device 10A, the first outer peripheral edge 20a and the third outer peripheral edge 20c are connected via the first virtual intersecting peripheral edge 30a, the first outer peripheral edge 20a and the fourth outer peripheral edge 20d are connected via the second virtual intersecting peripheral edge 30b, the second outer peripheral edge 20b and the third outer peripheral edge 20c are connected via the third virtual intersecting peripheral edge 30c, and the second outer peripheral edge 20b and the fourth outer peripheral edge 20d are connected via the fourth virtual intersecting peripheral edge 30d, so that the first to fourth outer peripheral edges 20a to 20d of the first to fourth extension members 12a to 12d and the first to fourth virtual intersecting peripheral edges 30a to 30d form an elliptical shape elongated in the vertical direction (intersecting direction). Note that the first to fourth outer peripheral edges 20a to 20d of the first to fourth extension members 12a to 12d and the first to fourth virtual intersecting peripheral edges 30a to 30d may form an elliptical shape elongated in the width direction (one direction).

In the display device 10A, a first intersection corner 31a at which the first end edge 13 and the first side edge 15 of the display body 11 intersect each other extends radially outward from the first virtual intersecting peripheral edge 30a connecting the first outer peripheral edge 20a of the first extension member 12a and the third outer peripheral edge 20c of the third extension member 12c, and a second intersection corner 31b at which the first end edge 13 and the second side edge 16 of the display body 11 intersect each other extends radially outward from the second virtual intersecting peripheral edge 30b connecting the first outer peripheral edge 20a of the first extension member 12a and the fourth outer peripheral edge 20d of the fourth extension member 12d. Furthermore, a third intersection corner 31c at which the second end edge 14 and the first side edge 15 of the display body 11 intersect each other extends radially outward from the third virtual intersecting peripheral edge 30c connecting the second outer peripheral edge 20b of the second extension member 12b and the third outer peripheral edge 20c of the third extension member 12c, and a fourth intersection corner 31d at which the second end edge 14 and the second side edge 16 intersect each other extends radially outward from the fourth virtual intersecting peripheral edge 30d connecting the second outer peripheral edge 20b of the second extension member 12b and the fourth outer peripheral edge 20d of the fourth extension member 12d.

In the display device 10A, the first to fourth outer peripheral edges 20a to 20d defining the arcs of the first to fourth extension members 12a to 12d (first to fourth extension portions) and the first to fourth virtual intersecting peripheral edges 30a to 30d that form an elliptical shape elongated in the vertical direction (or width direction) surround the front panel 17, and the first to fourth intersection corners 31a to 31d extend radially outward from the first to fourth virtual intersecting peripheral edges 30a to 30d forming an elliptical shape, so that the rectangular front panel 17 can have decorative beauty or functional beauty formed by a combination of a rectangle and an ellipse (circle) due to the first to fourth extension members 12a to 12d. The display device 10A has excellent beauty including decorative beauty or functional beauty formed by a combination of a rectangle and an ellipse (circle), includes the front panel 17 with good appearance, can cause a user who looks at the front panel 17 to have an aesthetic feeling, can stimulate the user's desire to use the display device 10A (desire of use), and can stimulate the user's desire to purchase the display device.

Figure 9:
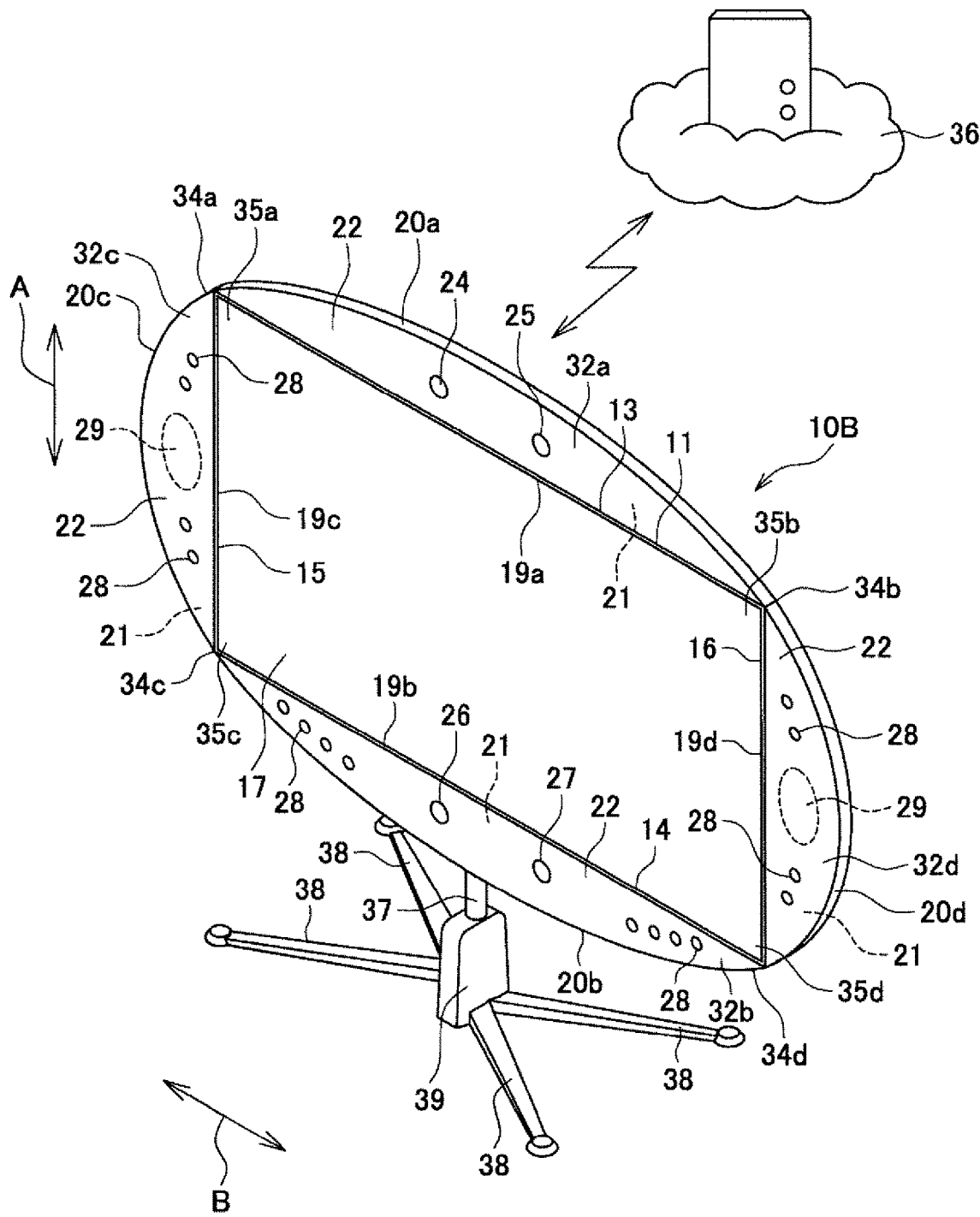
FIG. 9 is a perspective view of a display device illustrated as another example.
Figure 10:
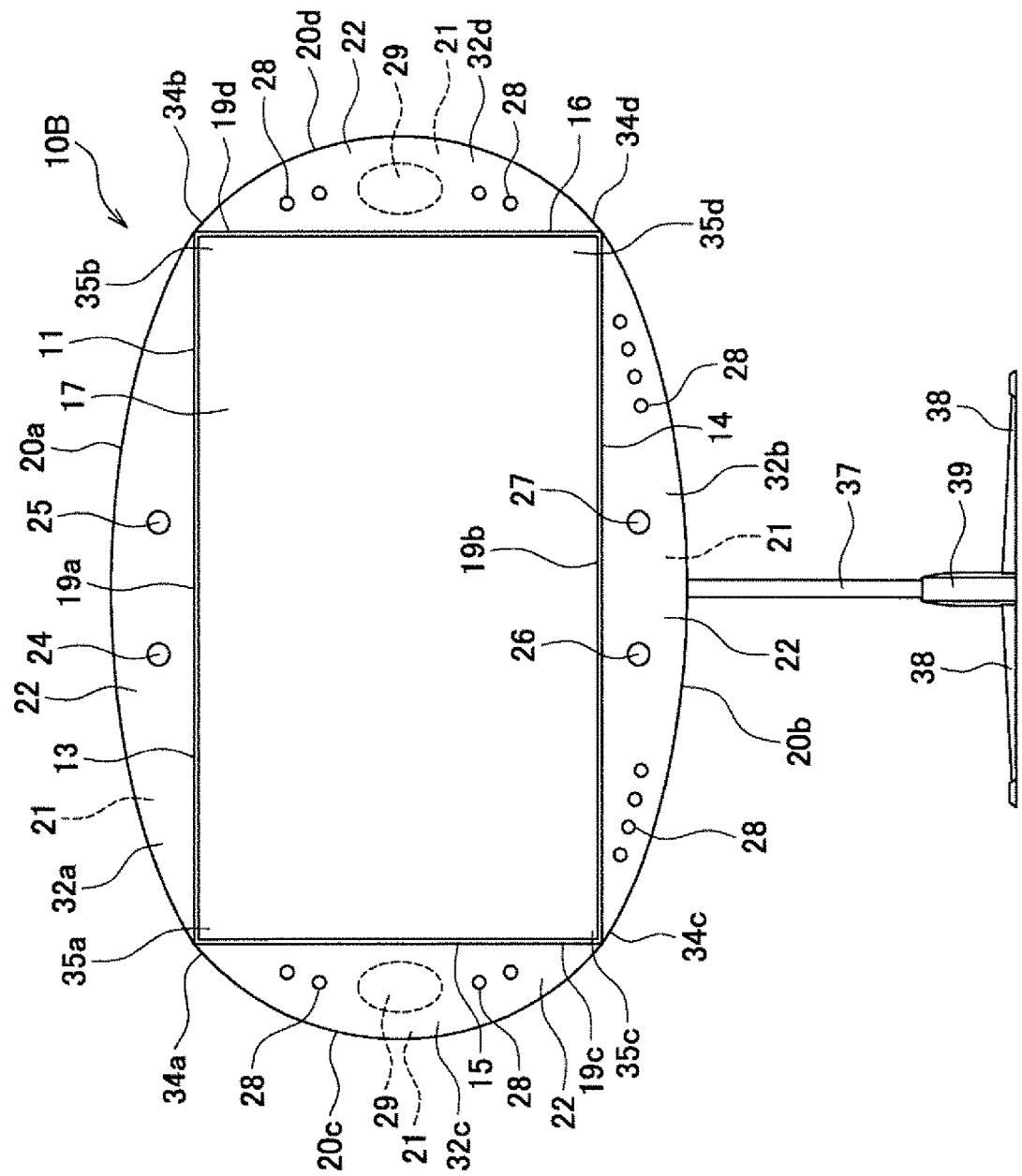
FIG. 10 is a front view of the display device illustrated in FIG. 9.
Figure 11:
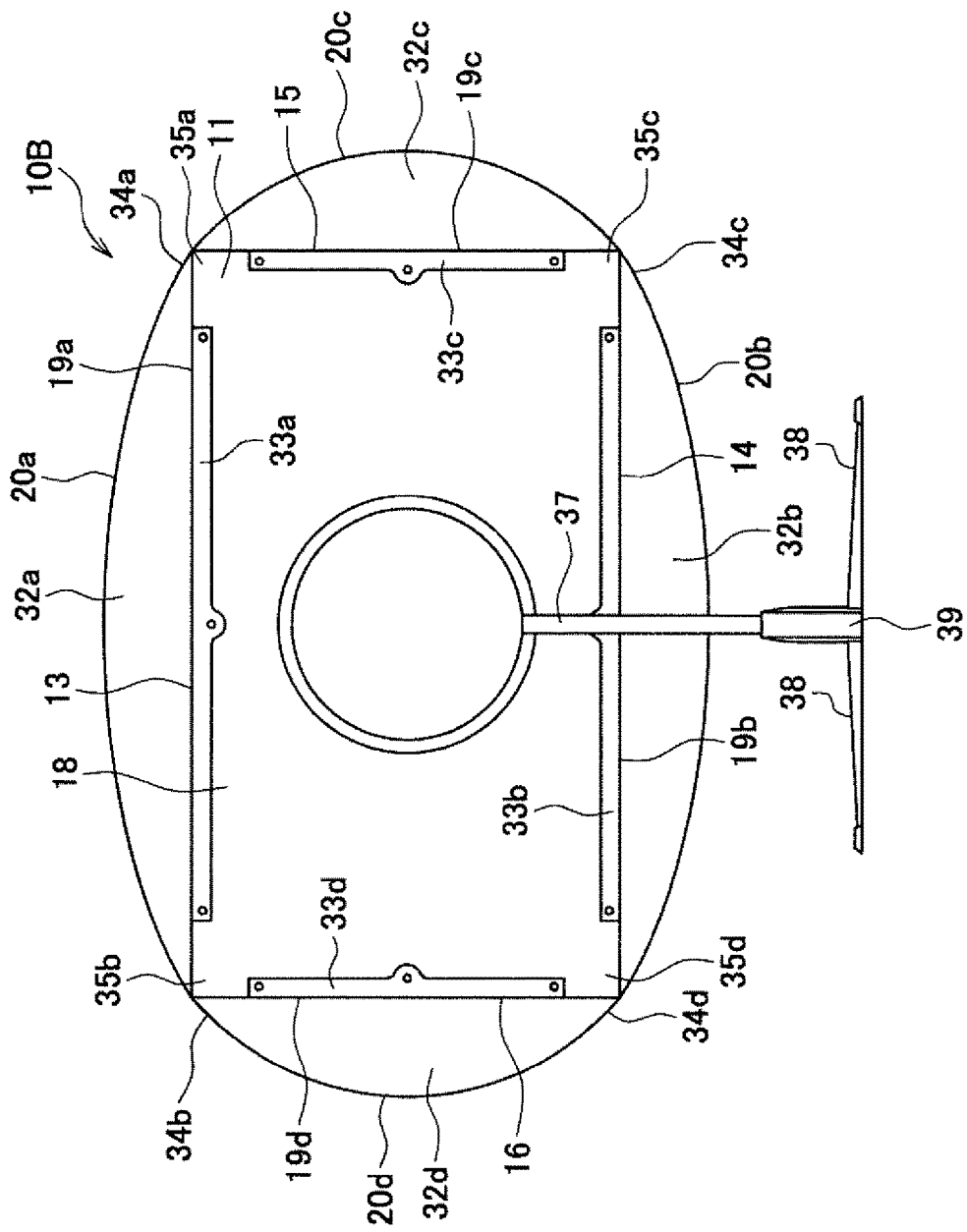
FIG. 11 is a rear view of the display device illustrated in FIG. 9.
Figure 12:
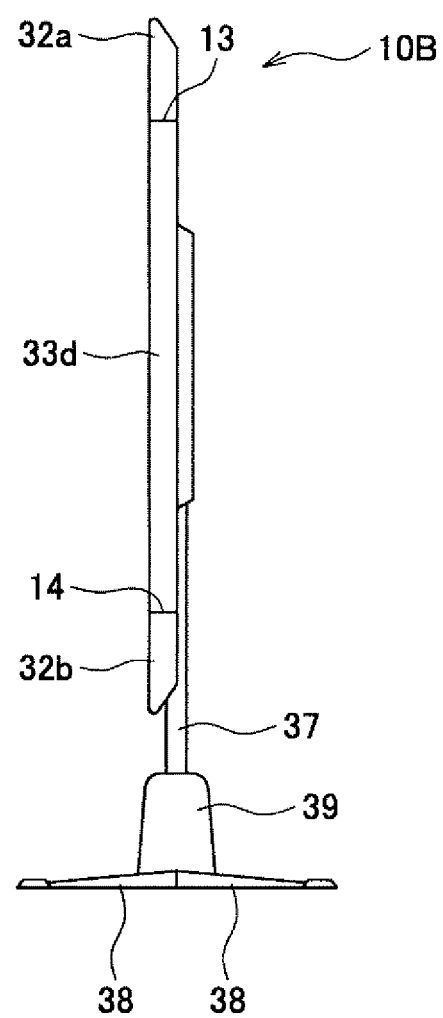
FIG. 12 is a side view of the display device illustrated in FIG. 9.
Figure 13:
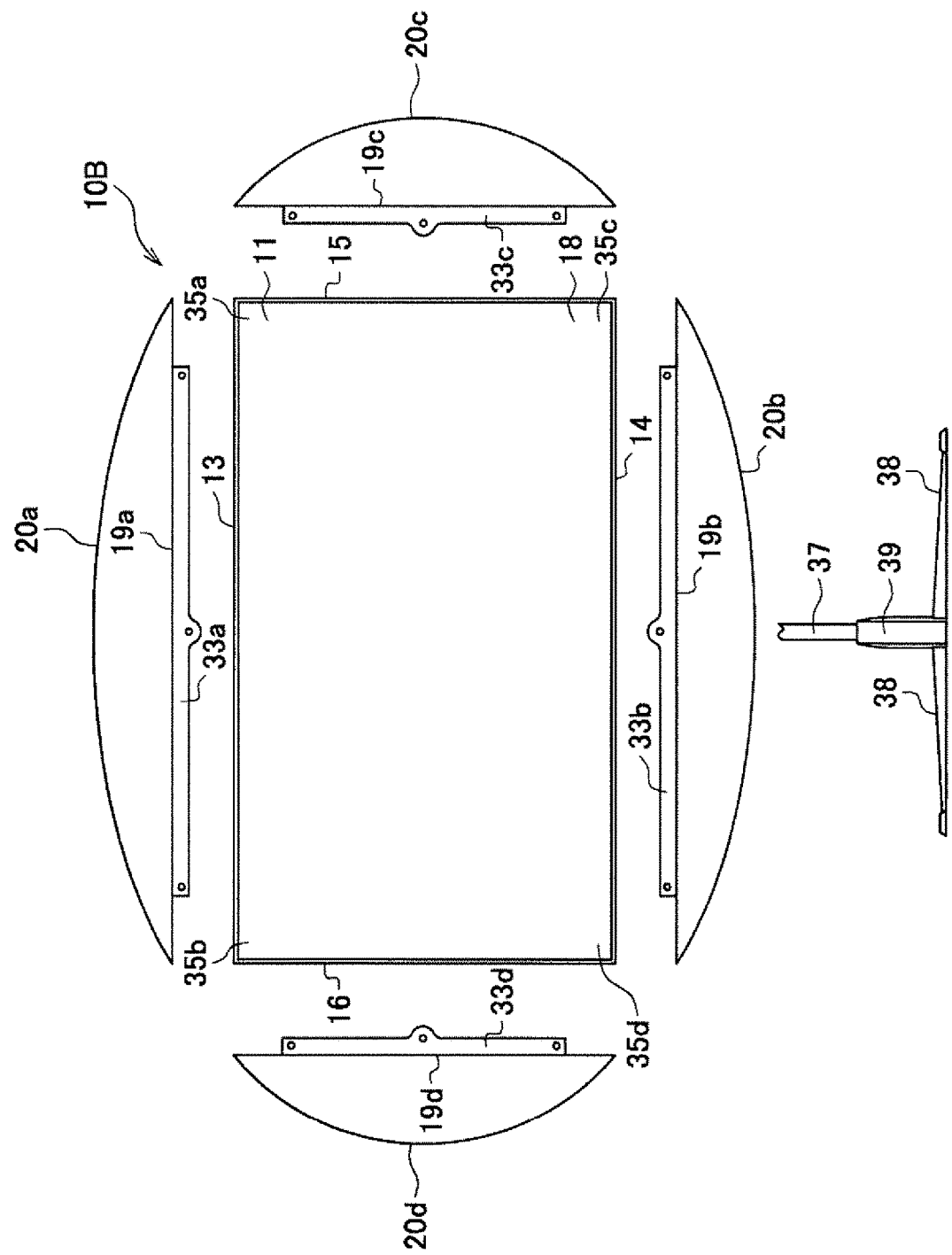
FIG. 13 is an exploded view illustrating a state where first to fourth extension members are removed from the display device.

FIG. 9 is a perspective view of a display device 10B illustrated as another example, and FIG. 10 is a front view of the display device 10B illustrated in FIG. 9. FIG. 11 is a rear view of the display device 10B illustrated in FIG. 9, and FIG. 12 is a side view of the display device 10B illustrated in FIG. 9. FIG. 13 is an exploded view illustrating a state where first to fourth extension members 32a to 32d are removed from the display device 10B. In FIG. 9, the vertical direction is indicated by the arrow A, and the width direction is indicated by the arrow B.

The display device 10B (display system) includes the display body 11 and the first to fourth extension members 32a to 32d (first to fourth extension portions) attached to the display body 11. The display body 11 includes the first end edge 13 and the second end edge 14 extending in the width direction (one direction) in parallel with each other, the first side edge 15 and the second side edge 16 extending in the vertical direction (intersecting direction) intersecting with the width direction (one direction) in parallel with each other, and the front panel 17 and the back surface area 18 surrounded by the end edges 13 and 14 and the side edges 15 and 16. The display body 11 (front panel 17 and back surface area 18) is molded into a rectangle with a predetermined area long in the width direction (one direction). Note that the display body 11 (front panel 17 and back surface area 18) may be molded into a rectangle with a predetermined area long in the vertical direction (intersecting direction). A predetermined image is output to (displayed on) the front panel 17 of the display body 11. A controller (control device) (not illustrated) is housed in the display body 11.

The first extension member 32a (first extension portion) is detachably attached to the first end edge 13 of the display body 11. The first extension member 32a includes the first inner peripheral edge 19a extending in the width direction (one direction) in parallel with the first end edge 13, and the first outer peripheral edge 20a defining an arc so as to project upward in the vertical direction (radially outward) from the first inner peripheral edge 19a (first end edge 13). The first extension member 12a is molded into a crescent shape whose planar shape (front shape) is long in the width direction, and extends upward in the vertical direction (radially outward) from the first end edge 13 of the display body 11.

A device housing space (not illustrated) is formed inside the first extension member 32a. The front opening 21 of the first extension member 32a is covered with the cloth 22 (woven fabric or knitted fabric such as loudspeaker grill mesh). A first mounting plate 33a extending in the width direction (one direction) is integrally connected to the first inner peripheral edge 19a of the first extension member 32a. The first extension member 32a is disposed on the first end edge 13 of the display body 11 by fixing the first mounting plate 33a to the first end edge 13 of the display body 11 by a predetermined mounting means (mounting bolt, screw, or the like).

The digital camera 24 and the microphone 25 are housed in the device housing space of the first extension member 32a. The digital camera 24 is connected to a controller via an interface, and the lens is directed forward from the front opening 21 of the first extension member 32a to capture a user or an object positioned in front of the front panel 17. The digital camera 24 transmits the captured image data to the controller. The microphone 25 is connected to the controller via the interface, and collects the voice of the user positioned in front of the front panel 17. The microphone 17 transmits the collected audio data to the controller.

The second extension member 32b (second extension portion) is detachably attached to the second end edge 14 of the display body 11. The second extension member 32b includes the second inner peripheral edge 19b extending in the width direction (one direction) in parallel with the second end edge 14, and the second outer peripheral edge 20b defining an arc so as to project downward in the vertical direction (radially outward) from the second inner peripheral edge 19b (second end edge 14). The second extension member 32b is molded into a crescent shape whose planar shape (front shape) is long in the width direction, and extends upward in the vertical direction (radially outward) from the second end edge 14 of the display body 11.

A device housing space (not illustrated) is formed inside the second extension member 32b. The front opening 21 of the second extension member 32b is covered with the cloth 22 (woven fabric or knitted fabric such as loudspeaker grill mesh). A second mounting plate 33b extending in the width direction (one direction) is integrally connected to the second inner peripheral edge 19b of the second extension member 32b. The second extension member 32b is disposed on the second end edge 14 of the display body 11 by fixing the second mounting plate 33b to the second end edge 14 of the display body 11 by a predetermined mounting means (mounting bolt, screw, or the like).

The device housing space of the second extension member 32b houses the LED lamp 28 (illumination lamp), the human sensor 26, and the light detection sensor 27. The LED lamp 28 is connected to the controller via the interface and illuminates the front of the front panel 17. The human sensor 26 is connected to the controller via the interface, and senses a person positioned in front of the front panel 17. The human sensor 26 transmits a human detection signal or a human non-detection signal to the controller. The light detection sensor 27 is connected to the controller via the interface and detects light around the display device 10B. The light detection sensor 27 transmits a light detection signal or a light non-detection signal to the controller.

The third extension member 32c (third extension portion) is detachably attached to the first side edge 15 of the display body 11. The third extension member 32c includes the third inner peripheral edge 19c extending in the width direction (one direction) in parallel with the first side edge 15, and the third outer peripheral edge 20c defining an arc so as to project outward in the width direction (radially outward) from the third inner peripheral edge 19c (first side edge 15). The third extension member 32c is molded into a crescent shape whose planar shape (front shape) is long in the vertical direction, and extends outward in the width direction (radially outward) from the first side edge 15 of the display body 11.

A device housing space (not illustrated) is formed inside the third extension member 32c. The front opening 21 of the third extension member 32c is covered with the cloth 22 (woven fabric or knitted fabric such as loudspeaker grill mesh). A third mounting plate 33c extending in the width direction (one direction) is integrally connected to the third inner peripheral edge 19c of the third extension member 32c. The third extension member 32c is disposed on the first side edge 15 of the display body 11 by fixing the third mounting plate 33c to the first side edge 15 of the display body 11 by a predetermined mounting means (mounting bolt, screw, or the like). The speaker 29 and the LED lamp 28 (illumination lamp) are housed in the device housing space of the third extension member 32c. The speaker 29 is connected to the controller via the interface and generates a predetermined sound. The LED lamp 28 is connected to the controller via the interface and illuminates the front of the front panel 17.

The fourth extension member 32d (fourth extension portion) is detachably attached to the second side edge 16 of the display body 11. The fourth extension member 32d includes the fourth inner peripheral edge 19d extending in the width direction (one direction) in parallel with the second side edge 16, and the fourth outer peripheral edge 20d defining an arc so as to project outward in the width direction (radially outward) from the fourth inner peripheral edge 19d (second side edge 16). The fourth extension member 32d is molded into a crescent shape whose planar shape (front shape) is long in the vertical direction, and extends outward in the width direction (radially outward) from the second side edge 16 of the display body 11.

A device housing space (not illustrated) is formed inside the fourth extension member 32d. The front opening 21 of the fourth extension member 32d is covered with the cloth 22 (woven fabric or knitted fabric such as loudspeaker grill mesh). A fourth mounting plate 33d extending in the width direction (one direction) is integrally connected to the fourth inner peripheral edge 19d of the fourth extension member 32d. The fourth extension member 32d is disposed on the second side edge 16 of the display body 11 by fixing the fourth mounting plate 33d to the second side edge 16 of the display body 11 by a predetermined mounting means (mounting bolt, screw, or the like). The speaker 29 and the LED lamp 28 (illumination lamp) are housed in the device housing space of the fourth extension member 32d. The speaker 29 is connected to the controller via the interface and generates a predetermined sound. The LED lamp 28 is connected to the controller via the interface and illuminates the front of the front panel 17.

In the display device 10B, the first outer peripheral edge 20a defining the arc of the first extension member 32a (first extension portion) and the third outer peripheral edge 20c defining the arc of the third extension member 32c (third extension portion) are connected at a first intersecting peripheral edge 34a, and the first outer peripheral edge 20a defining the arc of the first extension member 32a and the fourth outer peripheral edge 20d defining the arc of the fourth extension member 32d (fourth extension portion) are connected at a second intersecting peripheral edge 34b. Furthermore, the second outer peripheral edge 20b defining the arc of the second extension member 32b (second extension portion) and the third outer peripheral edge 20c defining the arc of the third extension member 32c are connected at a third intersecting peripheral edge 34c, and the second outer peripheral edge 20b defining the arc of the second extension member 32b and the fourth outer peripheral edge 20d defining the arc of the fourth extension member 32d are connected at a fourth intersecting peripheral edge 34d.

In the display device 10B, the first outer peripheral edge 20a and the third outer peripheral edge 20c are connected, the first outer peripheral edge 20a and the fourth outer peripheral edge 20d are connected, the second outer peripheral edge 20b and the third outer peripheral edge 20c are connected, and the second outer peripheral edge 20b and the fourth outer peripheral edge 20d are connected, so that the first to fourth outer peripheral edges 20a to 20d of the first to fourth extension members 12a to 12d and the first to fourth intersecting peripheral edges 34a to 34d define an elliptical shape elongated in the width direction (one direction). Note that the first to fourth outer peripheral edges 20a to 20d of the first to fourth extension members 12a to 12d and the first to fourth intersecting peripheral edges 34a to 34d may define an elliptical shape elongated in the vertical direction (intersecting direction).

In the display device 105, a first corner 35a at which the first end edge 13 and the first side edge 15 intersect each other is located radially inward of the first intersecting peripheral edge 34a at which the first outer peripheral edge 20a of the first extension member 32a and the third outer peripheral edge 20c of the third extension member 32c intersect each other, and a second corner 35b at which the first end edge 13 and the second side edge 16 intersect each other is located radially inward of the second intersecting peripheral edge 34b at which the first outer peripheral edge 20a of the first extension member 32a and the fourth outer peripheral edge 20d of the fourth extension member 32d intersect each other. Furthermore, a third corner 35c at which the second end edge 14 and the first side edge 15 intersect each other is located radially inward of the third intersecting peripheral edge 34c at which the second outer peripheral edge 20b of the second extension member 32b and the third outer peripheral edge 20c of the third extension member 32c intersect each other, and a fourth corner 35d at which the second end edge 14 and the second side edge 16 intersect each other is located radially inward of the fourth intersecting peripheral edge 34d at which the second outer peripheral edge 20b of the second extension member 32b and the fourth outer peripheral edge 20d of the fourth extension member 32d intersect each other.

Note that, in the display devices 10A and 108, the arrangements of the digital camera 24, the microphone 25, the human sensor 26, the LED lamp 27 (illumination lamp), and the speaker 28 with respect to the first to fourth extension members 12a to 12d and 32a to 32d are not limited to those illustrated, and the arrangements of the digital camera 24, the microphone 25, the human sensor 26, the LED lamp 27 (illumination lamp), and the speaker 28 with respect to the first to fourth extension members 12a to 12d and 32a to 32d can be freely determined.

In the display device 10B, the first to fourth outer peripheral edges 20a to 20d defining the arcs of the first to fourth extension members 32a to 32d (first to fourth extension portions) and the first to fourth intersecting peripheral edges 34a to 34d that form an elliptical shape elongated in the width direction (or vertical direction) surround the front panel 17, and the first to fourth corners 35a to 35d are located radially inward of the first to fourth intersecting peripheral edges 34a to 34d defining an elliptical shape, so that the rectangular front panel 17 can have decorative beauty or functional beauty formed by a combination of a rectangle and an ellipse (circle) due to the first to fourth extension members 32a to 32d. The display device 10B has excellent beauty including decorative beauty or functional beauty formed by a combination of a rectangle and an ellipse (circle), includes the front panel 17 with good appearance, can cause a user who looks at the front panel 17 to have an aesthetic feeling, can stimulate the user's desire to use the display device 10B, and can stimulate the user's desire to purchase the display device.

A controller (control device) built in the display body 11 of each of the display devices 10A and 10B (display systems) is connected to a cloud server 36 virtualized (formed) on a cloud (cloud computing) on the Internet. The cloud server 36 is a virtual server that includes a virtual CPU or a virtual MPU (central processing unit), a virtual main memory, and a virtual cache memory (memory), and is operated by an independent operating system (virtual OS), and has a mass storage area generated therein. As the cloud, Infrastructure as a Service (IaaS), Platform as a Service (PaaS), and Software as a Service (SaaS) can be used. In the virtual main memory of the cloud server 36, a display system application (including 3D design application for processing image data into 3D image, translation application for translating voice or character into multi-language, and artificial intelligence algorithm) that performs each means of the display system to be described later is stored.

Note that the controller (control device) may be a physical server (computer). The physical server includes a central processing unit (CPU or MPU) and a memory (main memory and cache memory), and incorporates a mass storage area (mass hard disk) therein. The cloud server 36 (or physical server) is formed (installed) in a data center contracted by a provider (provider company) who provides the display system. The cloud server 36 (or physical server) may be formed (installed) in a business office or an office of the provider (provider company) that provides the display system.

Various types of servers (various types of virtual servers) such as a DNS server that sets association between a host name and an IF address assigned to the host name, a database file server that accepts a request from another computer or another server and provides a function of reading and writing various types of information, a web server necessary for disclosing a homepage, a mail server for transmitting and receiving electronic mails, and a document server that stores all data such as created sentences and images and makes it possible to search for the data are connected to the cloud server 36 (or physical server), and the servers form a server group (virtual server group).

Note that, in some cases, the cloud server 36 (or physical server) itself has a DNS server function, a database server function, a web server function, a mail server function, and a document server function, and is divided into pieces of software for the individual server functions. The cloud server 36 (or physical server) can access any other server without access restriction using the Internet while passing through a plurality of various types of DNS servers connected to the Internet. The cloud server 36 (or physical server) forms a network with other servers in data centers located anywhere in the world via the Internet.

The mass storage area in the cloud server 36 (or mass storage area in physical server) stores (stores) user identification information of a user who uses the display device 10A, stores (stores) face image data of the user who uses the display devices 10A and 10B, and stores (stores) audio data of the user who uses the display devices 10A and 10B (user attribute information storage means). The user attribute information is stored in the mass virtual storage area in association with the user identification information (password, ID number, unique identifier, or the like) of the user. The user attribute information includes the name, address, telephone number, FAX number, age, gender, and mail address of the user, and the like.

The mass storage area in the cloud server 36 (or mass storage area in physical server) stores (stores) URLs of other servers (including URLs of servers of foreign friends) and IP addresses. The mass storage area in the cloud server 36 (or mass storage area in physical server) stores (stores) electrical apparatus identification information for specifying electrical appliances (electrical apparatuses) such as a refrigerator, an air conditioner (air conditioner), a washing machine, a water heater (water heater), a lighting fixture, a cleaning robot, a cotatsu, and a floor heater (electrical apparatus identification information storage means).

As the electrical apparatus identification information, individual identification numbers or machine numbers of a refrigerator, an air conditioner, a washing machine, a water heater, a lighting fixture, a cleaning robot, a cotatsu, a floor heater, and the like can be used. In addition, the cloud server 36 (or physical server) can independently generate unique identifiers for identifying these apparatuses, and the generated identifiers can be used as the electrical apparatus identification information. The electrical apparatus identification information is stored in the mass virtual storage area in association with the subordinate user identification information (password, ID number, unique identifier, or the like) of the user who uses an electrical appliance (electrical apparatus).

The electrical apparatuses include not only those described above but also all electrical apparatuses operable by an IOT. The mass storage area in the cloud server 36 (or mass storage area in physical server) stores (stores) a process (job) performed by an electrical appliance (electrical apparatus) such as a refrigerator, an air conditioner, a washing machine, a water heater, a lighting fixture, a cleaning robot, a cotatsu, or a floor heater using the IOT in association with the electrical apparatus identification information. The electrical apparatus has a wireless LAN function, receives predetermined information (process) from the cloud server 36 (or physical server) via a wireless LAN, and transmits the predetermined information to the cloud server 36 (or physical server) via the wireless LAN.

In the back surface area 18 of each of the display devices 10A and 10B, the support rod 37 extending straight in the vertical direction is installed. A first motor (not illustrated) is installed on an upper part of the support rod 37 (at center of back surface area 18). The control unit of the first motor is connected to a controller via an interface. A linear motor (not illustrated) is installed in the support rod 37. The control unit of the linear motor is connected to the controller via the interface. A stand 39 having four legs 38 is connected to a lower part of the support rod 37. A second motor (not illustrated) is installed in the stand 39. The control unit of the second motor is connected to the controller via the interface.

The display devices 10A and 10B including the first to fourth extension members 12a to 12d and 32a to 32d automatically (automatically) turn in a clockwise direction and a semi-clockwise direction by the first motor about the center thereof (see FIG. 6). The display devices 10A and 10B including the first to fourth extension members 12a to 12d and 32a to 32d automatically (automatically) moves upward and downward in the vertical direction along the support rod 37 by the linear motor (see FIG. 7). The display devices 10A and 10B including the first to fourth extension members 12a to 12d and 32a to 32d automatically (automatically) rotates about the support rod 37 in a direction around the support rod 37 (see FIG. 8).

The display devices 10A and 10B (controller (cloud server or physical server)) each include a communication means that transmits and receives predetermined data to and from another server using the Internet (predetermined network). The display devices 10A and 10B (controller (cloud server 36 or the physical server)) implement an image capturing means that captures an object or a user using the digital camera 24, and implement an image data transmission means that transmits the image data of the object or the user captured by the capturing means to another server using the communication means. The display devices 10A and 10B (controller (cloud server 36 or physical server)) implement an image data reception means that receives the image data of an object or a third party facing the user via the display devices 10A and 10B from another server using the communication means, and implement an image data output means that outputs (displays) the image of the object or the third party received by the image data reception means to the front panel 17.

The display devices 10A and 10B (controller (cloud server 36 or physical server)) implement a voice collection means that collects the voice of the user using the microphone 25, and implement an audio data transmission means that transmits the audio data of the user collected by the voice collection means to another server using the communication means. The display devices 10A and 10B (controller 36 (cloud server or physical server)) implement an audio data reception means that receives the audio data of a third party interacting with the user via the display devices 10A and 10B from another server using the communication means, and implement a voice output means that emits (outputs) the voice of the third party received by the audio data reception means using the speaker 29.

In a case where a request emitted by the user is collected by the voice collection means, the display devices 10A and 10B (controller (cloud server 36 or physical server)) implement a website introduction information reception means that receives website introduction information of a plurality of various types of websites corresponding to the request with the request as a keyword from another server using the communication means, implement a website introduction information output means that outputs (displays) the website introduction information received by the website introduction information reception means to the front panel 17, and implement a website output means that, when a predetermined website is designated from the plurality of various types of websites output (displayed) by the website introduction information output means, outputs (displays) the designated website to the front panel 17.

In a case where the request emitted by the user is collected by the voice collection means, the display devices 10A and 10B (controller (cloud server 36 or physical server)) implement a request-related data reception means that receives various types of request-related data related to the request with the request as a keyword from another server using the communication means, and implement a request-related data output means that outputs (displays) the request-related data received by the request-related data reception means to the front panel 17.

The display devices 10A and 10B (controller (cloud server 36 or physical server)) implement a translation means that translates voice emitted by the user and voice of a third party received from another server into a predetermined language, and implement a translated voice output means that outputs the voice of the user and the voice of the third party translated by the translation means using the speaker 29. In a case where a command to cause a predetermined electrical apparatus to perform a predetermined process by the IOT is input, the display devices 10A and 10B (cloud server 36 or physical server) implement a process performance means that transmits the predetermined process corresponding to the command to the electrical apparatus using the Internet (communication means) and causes the electrical apparatus to perform the predetermined process.

In a case where the human sensor 26 detects a person, the display devices 10A and 10B (controller (cloud server 36 or physical server)) implement a display first activation means that activates the display devices 10A and 10B, and implement a display first stop means that stops the activated display devices 10A and 10B in a case where no person is detected after the human sensor 26 detects a person.

After being activated by the display first activation means, the display devices 10A and 10B (controller (cloud server 36 or physical server)) implement an image data first comparison means that captures a person positioned in front of the front panel 17 by the capturing means and compares the image data of the captured person with the image data of the user stored in advance, and implement the display first stop means in a case where the image of the captured person is different from the stored image of the user as a result of comparing the image of the captured person with the stored image of the user by the image data first comparison means.

In a case where an activation message emitted by the user is collected by the voice collection means, the display devices 10A and 10B (controller (cloud server 36 or physical server)) implement a voice first comparison means that compares the voice of the collected activation message of the user with the voice of the user stored in advance, implement a display second activation means that activates the display devices 10A and 10B in a case where the voice of the activation message is the same as the stored voice of the user as a result of comparing the voice of the activation message with the stored voice of the user by the voice first comparison means, and implement a display second stop means that stops the activated display devices 10A and 10B in a case where a stop message emitted by the user is collected by the voice collection means.

In a case where the human sensor 26 detects a person and the light detection sensor 27 does not detect light around the display devices 10A and 10B, the display devices 10A and 10B (controller (cloud server 36 or physical server)) implement an illumination-lamp first activation means that activates the LED lamp 28, and implement an illumination-lamp first turn-off means that turns off the activated LED lamp 28 in a case where the human sensor 26 does not detect a person or the light detection sensor 27 detects light around the display devices 10A and 10B.

After activating the LED lamp 28 by the illumination-lamp first activation means, the display devices 10A and 10B (controller (cloud server 36 or physical server)) implement an image data second comparison means that captures a person positioned in front of the front panel 17 by the capturing means and compares the image data of the captured person with the image data of the user stored in advance, and implement the illumination-lamp first stop means in a case where the image of the captured person is different from the stored image of the user as a result of comparing the image of the captured person with the stored image of the user by the image data second comparison means.

In a case where an illumination-lamp activation message emitted by the user is collected by the voice collection means, the display devices 10A and 10B (controller (cloud server 36 or physical server)) implement a voice second comparison means that compares the collected voice of the illumination-lamp activation message from the user with the voice of the user stored in advance, implement an illumination-lamp second activation means that activates the LED lamp 28 in a case where the voice of the illumination-lamp activation message is the same as the stored voice of the user as a result of comparing the voice of the illumination-lamp activation message with the stored voice of the user by the voice second comparison means, and implement an illumination-lamp second turn-off means that turns off the activated LED lamp 28 in a case where an illumination lamp stop message emitted by the user is collected by the voice collection means.

The display devices 10A and 10B (controller (cloud server 36 or physical server)) implement a display turning means that automatically turns the display devices 10A and 10B in a clockwise direction or a semi-clockwise direction in a case where a display turn message emitted by the user is collected by the voice collection means. The display devices 10A and 10B (controller (cloud server 36 or physical server)) implement a display vertically-moving means that automatically moves the display devices 10A and 10B upward or downward in the vertical direction in a case where a display vertical-movement message emitted by the user is collected by the voice collection means. The display devices 10A and 10B (controller (cloud server 36 or physical server)) implement a display rotation means that automatically rotates the display devices 10A and 10B in a clockwise direction or a counterclockwise direction in a case where a display rotation message emitted by the user is collected by the voice collection means.

The display devices 10A and 10B (controller (cloud server 36 or physical server)) implement an adaptability estimation means that acquires an adaptability score indicating the degree of adaptability of the face posture of the user who visually recognizes the front panel 17 from a learning model by inputting the image data of the face of the user captured by the image capturing means to a learned learning model that has performed machine learning for estimating the degree of adaptability of the face posture of the user who visually recognizes the front panel 17, and implement a display movable means that automatically moves the display device up and down, or rotates or turns the display device in such a manner that the adaptability score acquired by the adaptability estimation means satisfies a predetermined condition.

The learning model is generated using a known machine learning algorithm (artificial intelligence algorithm) such as a neural network. The training data to be input to the machine learning algorithm (artificial intelligence algorithm) is created, for example, by capturing images of the face of the user positioned in the vicinity of the front panel 17 of the display devices 10A and 10B at various angles by the image capturing means and associating the adaptability score with the image data of the face captured. For the adaptability score, ten numerical parameters from 0 to 10 are used. For example, in a case where the iris (pupil) of the eye of the user who visually recognizes the front panel 17 (looks at front panel 17) is located at the center of the eye, it is determined that the display devices 10A and 10B are at optimal positions, and a high numerical parameter is set. On the other hand, in a case where the iris (pupil) of the eye of the user who visually recognizes the front panel 17 (looks at front panel 17) deviates from the center of the eye, it is determined that the display devices 10A and 10B are not at optimal positions, and a low numerical parameter is set.

Hereinafter, the activation, stop, turn, vertical movement, and rotation of the display device 10A will be described as an example, and at the same time, the activation and stop of the LED lamp 28 will be described. However, the activation, stop, turn, vertical movement, and rotation of the display device 10B and the activation and stop of the LED lamp 28 are the same as those of the display device 10A. An example of the activation and stop of the display device 10A is as follows. When the user is positioned in the vicinity of the display device 10A (at distance of 50 cm to 500 cm from display device 10A) and in front of the front panel 17, the human sensor 26 detects the user (person), and the human sensor 26 transmits a human detection signal to the controller. The controller (cloud server 37 or physical server) that has received the human detection signal turns on the ON/OFF switch of the display device 10A to activate the display device 10A (display first activation means).

After the human sensor 26 detects the user (person), in a case where the user moves away from the front of the front panel 17 and the human sensor 26 no longer detects the user (person), the human sensor 26 transmits a human non-detection signal to the controller. The controller (cloud server 36 or physical server) that has received the human non-detection signal turns off the ON/OFF switch of the display device 10A to stop the display device 10A (display first stop means).

In a case where the human sensor 26 detects the presence or absence of a person in front of the front panel 17, and detects a person, the display device 10A (including display device 10B) can be automatically activated, and in a case where the human sensor 26 no longer detects a person, the activated display device 10A can be automatically stopped, so that the activation and stop of the display device 10A can be automatically performed using the human sensor 26.

Note that, after the display device 10A is activated by the display first activation means, the controller (cloud server 36 or physical server) transmits a capturing signal for capturing the face image of the user (person) positioned in front of the front panel 17 to the control unit of the digital camera 24, captures the face image of the user (person) positioned in front of the front panel 17 using the digital camera 24 (image capturing means), and compares the face image data (image data) of the person (user) captured with the face image data (image data) of the user stored in advance (image data first comparison means).

As a result of comparing the face image data (image data) of the person (user) captured with the stored face image data (stored image data) of the user by the image data first comparison means, in a case where the face image data of the person (user) captured is different from the stored face image data of the user, the controller (cloud server 36 or physical server) turns off the ON/OFF switch of the display device 10A to stop the display device 10A (display first stop means). Since the display device 10A (including display device 10B) stops the activated display device 10A in a case where the user of the display device 10A is different from the captured person, only a valid user can use the display device 10A, and unauthorized use of the display device 10A can be prevented.

Another example of the activation and stop of the display device 10A is as follows. The user of the display device 10A moves to the vicinity of the display device 10A (distance of 50 cm to 500 cm from display device 10A) and emits an activation message (for example, ON, activation, or the like) of the display device 10A. The activation message emitted by the user is collected by the speaker 29, and an electrical signal of the activation message is transmitted to the controller (voice collection means). The controller (cloud server 36 or physical server) that has received the electrical signal of the activation message compares the audio data (voice) of the activation message of the user collected by the voice collection means with the audio data (voice) of the user stored in advance (voice first comparison means). As a result of comparing the audio data of the activation message with the stored audio data of the user by the voice first comparison means, in a case where the audio data of the activation message and the stored audio data of the user are the same, the controller activates (turns on) the display device 10A (display second activation means).

To stop (turn off) the display device 10A, the user emits a stop message (for example, OFF, stop, or the like) of the display device 10A. The stop message emitted by the user is collected by the speaker 29, and an electrical signal of the stop message is transmitted to the controller (voice collection means). The controller (cloud server 36 or physical server) that has received the electrical signal of the stop message stops (turns off) the activated display device 10A (display second stop means). Note that the activation operation and stop operation of the display device 10A can also be performed by a remote controller (not illustrated).

In a case where the voice of the activation message is compared with the stored voice of the user, and the voice of the activation message is the same as the stored voice of the user, the display device 10A (including display device 10B) is activated. Therefore, not only the display device 10A can be activated only by the voice of the user, but also the display device 10A is not activated in a case where the voice of the activation message is different from the stored voice of the user, so that only a valid user can activate the display device 10A, and unauthorized use of the display device 10A can be prevented. The display device 10A (including display device 10B) can be automatically stopped by the stop message emitted by the user, and the activation and stop of the display device 10A can be automatically performed by the voice of the user.

An example of the activation and stop of the LED lamp 28 installed in the second to fourth extension members 12a to 12d of the display device 10A is as follows. When the user is positioned in the vicinity of the display device 10A (at distance of 50 cm to 500 cm from display device 10A) and in front of the front panel 17, the human sensor 26 detects the user (person), and the human sensor 26 transmits a human detection signal to the controller. Furthermore, in a case where the light detection sensor 27 does not sense light around the display device 10A, a light non-detection signal is transmitted to the controller. The controller (cloud server 36 or physical server) that has received the human detection signal from the human sensor 26 and the light non-detection signal from the light detection sensor 27 activates (turns on) the LED lamp 28 to illuminate the front of the front panel 17 (illumination-lamp first activation means).

After the LED lamp 28 is activated, in a case where the user moves away from the front of the front panel 17 and the human sensor 26 no longer detects the user (person), the human sensor 26 transmits a human non-detection signal to the controller. The controller (cloud server 36 or physical server) that has received the human non-detection signal from the human sensor 26 stops (turns off) the activated LED lamp 28 (illumination-lamp first turn-off means). Alternatively, after the LED lamp 28 is activated, in a case where the periphery of the display device 10A becomes bright by, for example, natural light and the light detection sensor 27 detects light around the display device 10A, the light detection sensor 27 transmits a light non-detection signal to the controller. The controller (cloud server 36 or physical server) that has received the light non-detection signal from the light detection sensor 27 stops (turns off) the activated LED lamp 28 (illumination-lamp first turn-off means).

In the display device 10A (including display device 10B), in a case where the human sensor 26 detects the presence or absence of a person in front of the front panel 17 and the human sensor 26 detects a person, and the light sensing sensor 27 detects light around the display device 10A and the light sensing sensor 27 does not sense light, the LED lamp 28 can be automatically activated, and in a case where the human sensor 26 does not detect a person or the light sensing sensor 27 senses light, the activated LED lamp 28 can be automatically turned off, so that the activation and stop of the LED lamp 28 can be automatically performed using the human sensor 26 and the light sensing sensor 27.

Note that, after the LED lamp 28 is activated by the illumination-lamp first activation means, the controller (cloud server 36 or physical server) transmits a capturing signal for capturing the face image of the user (person) positioned in front of the front panel 17 to the control unit of the digital camera 24, captures the face image of the user (person) positioned in front of the front panel 17 using the digital camera 24 (image capturing means), and compares the face image data (image data) of the person (user) captured with the face image data (image data) of the user stored in advance (image data second comparison means).

As a result of comparing the face image data (image data) of the person (user) captured with the stored face image data (stored image data) of the user by the image data second comparison means, in a case where the face image data of the person (user) captured is different from the stored face image data of the user, the controller (cloud server 36 or physical server) stops (turns off) the LED lamp 28 (illumination-lamp first turn-off means). Since the display device 10A (including display device 10E) stops the activated LED lamp 28 in a case where the user of the display device 10A is different from the captured person, only a valid user can use the display device 10A including the LED lamp 28, and unauthorized use of the display device 10A including the LED lamp 28 can be prevented.

An example of the activation and stop of the LED lamp 28 is as follows. The user of the display device 10A moves to the vicinity of the display device 10A (distance of 50 cm to 500 cm from display device 10A) and emits an illumination-lamp activation message (for example, illumination lamp ON, LED activation, or the like). The illumination-lamp activation message emitted by the user is collected by the speaker 29, and an electrical signal of the illumination-lamp activation message is transmitted to the controller (voice collection means). The controller (cloud server 36 or physical server) that has received the electrical signal of the illumination-lamp activation message compares the audio data (voice) of the illumination-lamp activation message of the user collected by the voice collection means with the audio data (voice) of the user stored in advance (voice second comparison means). As a result of comparing the audio data of the illumination-lamp activation message with the stored audio data of the user by the voice second comparison means, in a case where the audio data of the illumination-lamp activation message and the stored audio data of the user are the same, the controller activates the LED lamp 28 (illumination-lamp second activation means).

To stop (turn off) the LED lamp 28, the user emits an illumination-lamp stop message (for example, illumination-lamp OFF, LED stop, or the like) of the LED lamp 28. The illumination-lamp stop message emitted by the user is collected by the speaker 29, and an electrical signal of the illumination-lamp stop message is transmitted to the controller (voice collection means). The controller (cloud server 36 or physical server) that has received the electrical signal of the illumination-lamp stop message stops (turns off) the activated LED lamp 28 (illumination-lamp second turn-off means). Note that the activation operation and stop operation of the LED lamp 28 can also be performed by a remote controller (not illustrated).

In a case where the voice of the illumination-lamp activation message is compared with the stored voice of the user, and the voice of the illumination-lamp activation message is the same as the stored voice of the user, the display device 10A (including display device 10B) activates the LED lamp 28. Therefore, not only the display device 10A can activate the LED lamp 28 only by the voice of the user, but also the display device 10A does not activate the LED lamp 28 in a case where the voice of the illumination-lamp activation message is different from the stored voice of the user, so that only a valid user can activate the display device 10A including the LED lamp 28, and unauthorized use of the display device 10A including the LED lamp 28 can be prevented. The display device 10A (including display device 103) can automatically stop the LED lamp 28 by the illumination-lamp stop message emitted by the user, and the activation and stop of the LED lamp 28 can be automatically performed by the voice of the user.

An example of the automatic turning of the display device 10A (including display device 10B) is as follows. The user positioned in the vicinity of the display device 10A (at distance of 50 cm to 500 cm from display device 10A) emits a display turn message (for example, right turn, left turn, or the like). The display turn message emitted by the user is collected by the speaker 29, and an electrical signal of the display turn message is transmitted to the controller (voice collection means). The controller (cloud server 36 or physical server) that has received the electrical signal of the display turn message activates the first motor and turns the display device 10A including the first to fourth extension members 12a to 12d in a clockwise direction by the rotation of the first motor (display turning means) in a case where the display turn message is right turn, and activates the first motor and turns the display device 10A including the first to fourth extension members 12a to 12d in a counterclockwise direction by the rotation of the first motor (display turning means) in a case where the display turn message is left turn. Note that the display turning means can be implemented after the display device 10A is activated by the display first activation means or the display second activation means. Alternatively, the turning operation of the display device 10A can also be performed by a remote controller (not illustrated).

Since the display device 10A (including display device 10B) automatically (automatically) turns in a clockwise direction or a semi-clockwise direction by the message voice of the user to turn the display device 10A in a clockwise direction or a semi-clockwise direction, the front panel 17 can be changed to either a vertically long state long in the vertical direction or a horizontally long state long in the horizontal direction only by the voice of the user, and the front panel 17 can be automatically changed to either the vertically long state or the horizontally long state in response to the voice of the user.

An example of the automatic vertical movement of the display device 10A (including display device 10B) is as follows. The user positioned in the vicinity of the display device 10A (at distance of 50 cm to 500 cm from display device 10A) emits a display vertical-movement message (for example, rising (extending), lowering (contracting), or the like). The turn message emitted by the user is collected by the speaker 29, and an electrical signal of the turn message is transmitted to the controller (voice collection means). In a case where the display vertical-movement message is rinsing (extending), the controller (cloud server 36 or physical server) that has received the electrical signal of the display vertical-movement message activates the linear motor, and drives the linear motor to raise (move) the display device 10A including the first to fourth extension members 12a to 12d upward in the vertical direction along the support rod (display vertically-moving means). In a case where the display vertical-movement message is lowering (contracting), the linear motor is activated to lower (move) the display device 10A including the first to fourth extension members 12a to 12d vertically downward along the support rod (display vertically-moving means). Note that the display vertically-moving means can be implemented after the display device 10A is activated by the display first activation means or the display second activation means. Alternatively, the vertical movement operation of the display device 10A can also be performed by a remote controller (not illustrated).

In the display device 10A (including display device 10B), the display device 10A automatically (automatically) moves upward and downward in the vertical direction by the vertical-movement message voice of the user. Therefore, the front panel 17 can be automatically moved upward and downward in the vertical direction only by the voice of the user, the position of the front panel 17 in the vertical direction can be automatically changed in response to the voice of the user, and the position of the front panel 17 in the vertical direction can be adjusted to a position easily viewable by the user.

An example of the automatic rotation of the display device 10A (including display device 10B) is as follows. The user positioned in the vicinity of the display device 10A (at distance of 50 cm to 500 cm from display device 10A) emits a display rotation message (for example, right rotation, left rotation, or the like). In a case where the display rotation message is right rotation, the controller (cloud server 36 or physical server) that has received an electrical signal of the display rotation message activates the second motor, and rotates the second motor to rotate the display device 10A including the first to fourth extension members 12a to 12d in a clockwise direction about the support rod 37 (display rotation means). In a case where the display rotation message is left rotation, the second motor is activated to rotate the display device 10A including the first to fourth extension members 12a to 12d in a counterclockwise direction about the support rod 37 (display rotation means). Note that the display rotation means can be implemented after the display device 10A is activated by the display first activation means or the display second activation means. Alternatively, the rotation operation of the display device 10A can also be performed by a remote controller (not illustrated).

In the display device 10A (including display device 10B), the display device 10A automatically rotates about the support rod 37 in a clockwise direction and a counterclockwise direction of the support rod 37 by the rotation message voice of the user. Therefore, even if the user is at any position, the front panel 17 can be automatically moved to the position easily viewable by the user only by the voice of the user, and the front panel 17 can be made visually recognizable to the user in response to the voice of the user.

Other examples of the automatic turn, automatic vertical movement, and automatic rotation of the display device 10A (including display device 10B) are as follows. An image of the face of the user positioned in the vicinity of the front panel 17 of the display device 10A (at distance of 50 cm to 500 cm from front panel 17 of display device 10A) is captured by the digital camera (image capturing means). The image data of the face of the user captured by the image capturing means is transmitted to the controller (cloud server 36 or physical server). The cloud server 36 (or physical server) that has received the image data of the face of the user inputs the image data of the face of the user (image data of iris (pupil) of eye of user) captured by the image capturing means to a learned learning model that has performed machine learning for estimating the degree of adaptability (degree to which iris (pupil) is positioned at center of eye or iris (pupil) is deviated from center of eye) to the face posture (iris (pupil) of eye of user) of the user visually recognizing the front panel 17 (looking at front panel 17), so that the adaptability score indicating the degree of adaptability of the face posture of the user visually recognizing the front panel 17 (degree to which iris (pupil) is positioned at center of eye or iris (pupil) is deviated from center of eye) is acquired from the learning model (adaptability estimation means).

Next, the cloud server 36 (or physical server) transmits, to the controller, a movable signal that causes the display device 10A to move up and down, rotate, or turn in such a manner that the adaptability score acquired by the adaptability estimation means satisfies a predetermined condition (in such a manner that adaptability score is held at high numerical parameter). The controller automatically vertically moves, rotates, or turns the display device 10A in accordance with the movable signal from the cloud server 36 (or physical server) (display movable means).

In the display device 10A (including display device 10B), the display device 10A is automatically moved up and down, rotated, or turned in such a manner that the adaptability score acquired by the adaptability estimation means implemented by artificial intelligence (artificial intelligence algorithm) satisfies a predetermined condition (in such a manner that adaptability score is held at numerical parameter with high adaptability score). Therefore, the display device 10A can be automatically moved to a position where the user visually recognizing the front panel 17 can see the front panel 17 most easily, and the front panel 17 can be brought into a state where the user can see the front panel 17 most easily, regardless of the position of the user.

Figure 14:
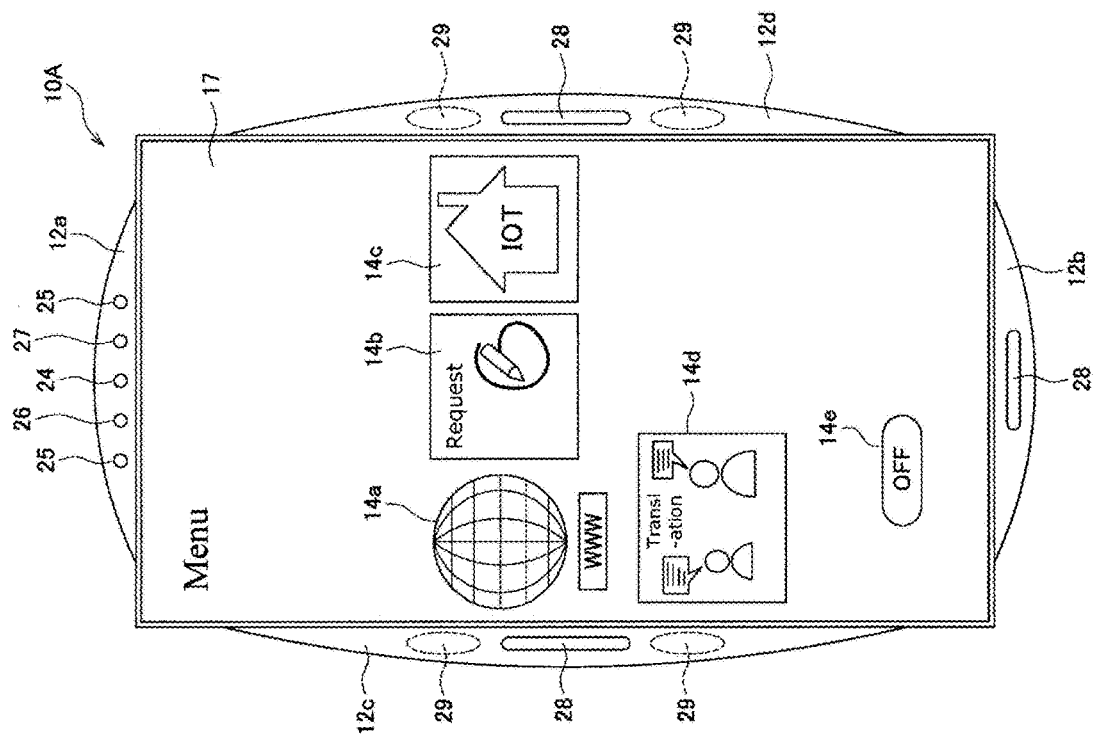
FIG. 14 is a diagram illustrating an example of a menu screen output to a front panel of the display device.
Figure 15:
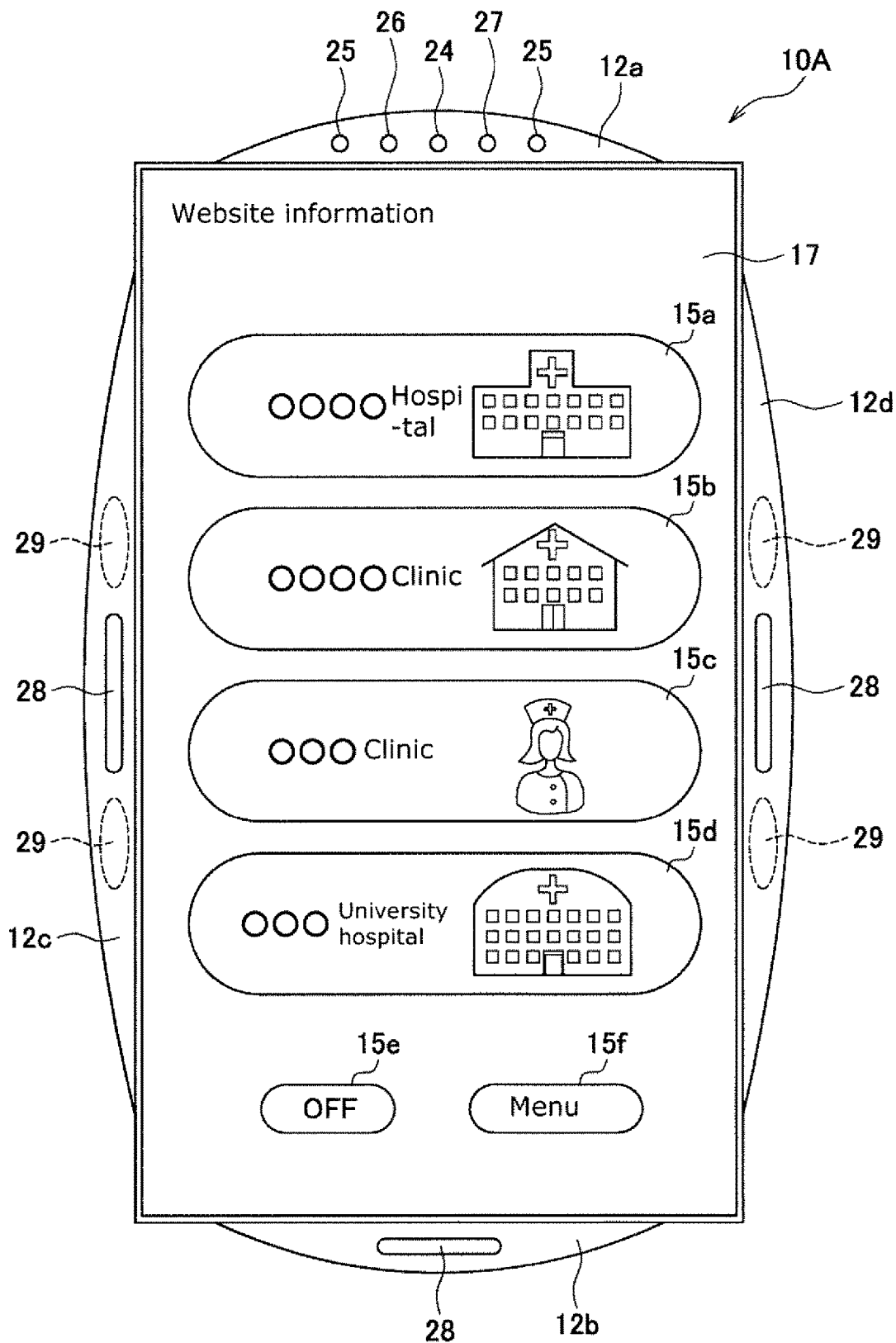
FIG. 15 is a diagram illustrating an example of a website introduction information screen output to the front panel of the display device.
Figures 1, 16:
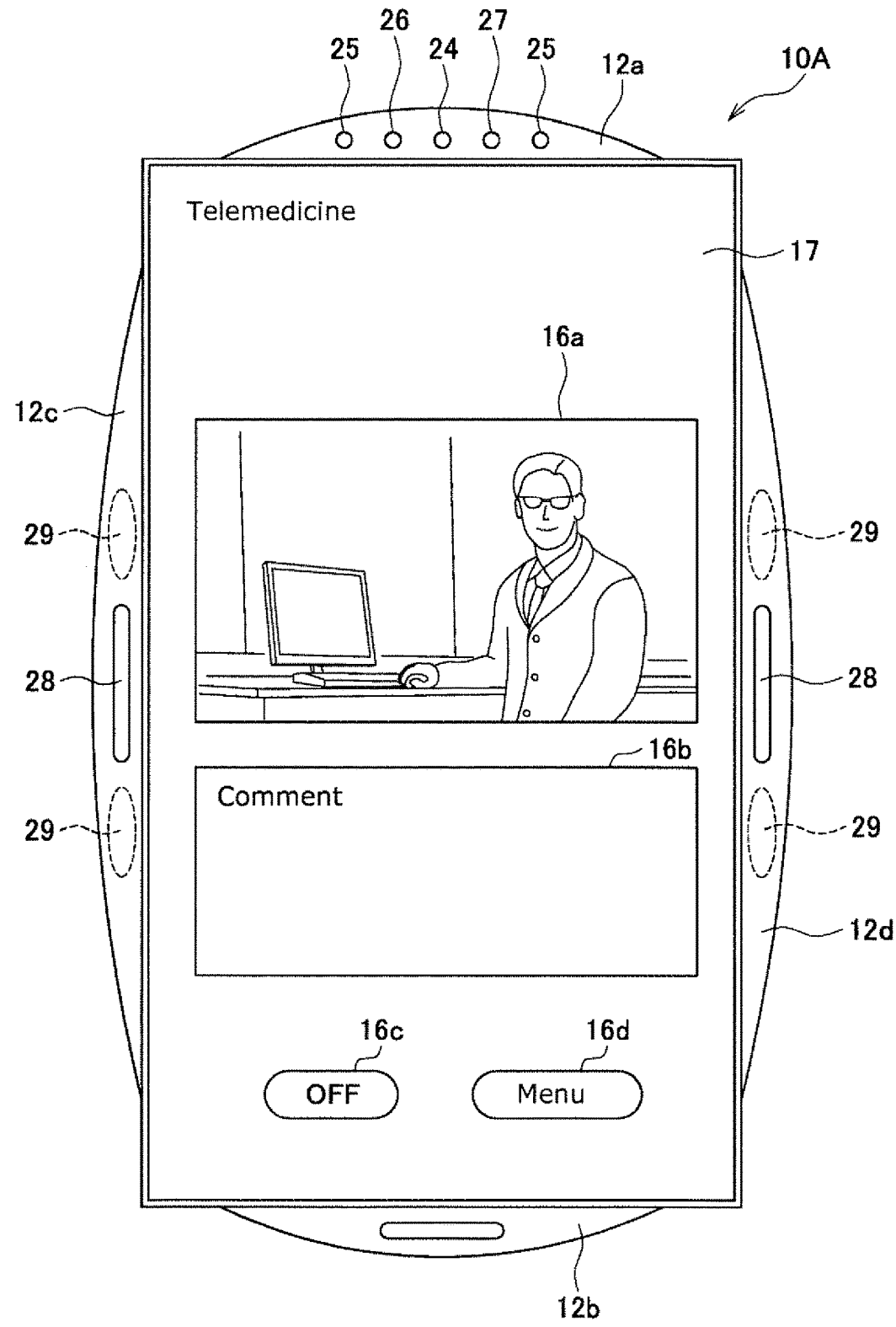
FIG. 16 is a diagram illustrating an example of a telemedicine screen output to the front panel of the display device.

FIG. 14 is a diagram illustrating an example of a menu screen output to the front panel 17 of the display device 10A, and FIG. 15 is a diagram illustrating an example of a website introduction information screen output to the front panel 17 of the display device 10A. FIG. 16 is a diagram illustrating an example of a telemedicine screen output to the front panel 17 of the display device 10A. In FIGS. 14 to 16, the support rod 37 and the stand 39 are not illustrated. Hereinafter, the use of a website will be described by exemplifying the display device 10A, but the use of the website by the display device 10B is also the same as that of the display device 10A.

When the display device 10A is activated, a standby screen (not illustrated) is output to (displayed on) the front panel 17 of the display body 11. On the standby screen, a terrestrial digital broadcast icon, a BS digital broadcast icon, a CS digital broadcast icon, a game icon, a display system icon, and an OFF button are output (displayed). When the OFF button is tapped (clicked), a message indicating OFF is emitted, or the OFF button of a remote controller is pressed, the display device 10A is turned off, and the display device 10A is stopped (same applies to following OFF buttons).

By tapping (clicking) the terrestrial digital broadcast icon, the BS digital broadcast icon, or the CS digital broadcast icon, or by emitting a message indicating a broadcast icon and determining the broadcast icon by the remote controller, various types of broadcasts can be viewed by the display device 10A (including display device 10B). By tapping (clicking) the game icon, emitting a message indicating the game icon, or determining the game icon by the remote controller, various types of games can be played by the display device 10A (including display device 10B). Note that a series of operations of the display device 10A (including display device 10B) (broadcast channel change, volume, play, record, and the like) can be performed by voice or a remote controller (not illustrated).

In a case where the user uses the display system, the user taps the display system icon on the standby screen, emits a message indicating the display system icon, or determines the display system icon by the remote controller. When the display system icon is tapped, emitted (collected by voice collection means) or determined, a menu screen illustrated in FIG. 14 is output to (displayed on) the front panel 17 of the display body 11. On the menu screen of FIG. 14, a website introduction icon 14a, a request display icon 14b, an IOT icon 14c, a translation icon 14d, and an OFF button 14e are output (displayed).

To view a desired website, the user taps the website introduction icon 14a, emits a message indicating the website introduction icon 14a, or determines the website introduction icon 14a by the remote controller. When the website introduction icon 14a is tapped, emitted (collected by voice collection means), or determined, a request input screen is output to (displayed on) the front panel 17 of the display body 11, which is not illustrated. On the request input screen, a request input area for inputting a request (keyword), a request determination button, a clear button, and an OFF button are output (displayed). When the clear button is tapped (clicked), the request (data) input to the input area is cleared, and data is input again (same applies to following clear buttons).

After inputting a predetermined request in the request input area, the user taps the request determination button. Alternatively, a message indicating the predetermined request is emitted. The request message emitted by the user is collected by the microphone 25, and an electrical signal of the request (keyword) is transmitted to the controller (voice collection means). Note that the request is assumed to be "telemedicine" or "remote diagnostics". When the request determination button is tapped or the electrical signal of the request is transmitted, the controller (cloud server 36 or physical server) receives a plurality of various types of websites corresponding to the request with the request as a keyword from another server using the Internet (communication means) (website introduction information reception means), and outputs (displays) introduction information of the plurality of various types of websites received from another server by the website introduction information reception means on the front panel 17 (website introduction information output means).

In the website introduction information output means, the controller (cloud server 36 or physical server) outputs (displays) the website introduction information screen illustrated in FIG. 15 to the front panel 17. On the website introduction information screen of FIG. 15, website output areas 15a to 15d that output (display) websites (homepages) of various types of medical institutions capable of telemedicine, an OFF button 15e, and a menu button 15f are output (displayed). When the menu button 15f is tapped (clicked) or a message indicating a menu is emitted, the menu screen illustrated in FIG. 14 is output (displayed) on the front panel 17 (same applies to following menu buttons and menu messages.). Note that by scrolling the website introduction information screen in the vertical direction, it is possible to display websites (homepages) of other various types of medical institutions.

When the user taps (selects) a desired one from the websites (homepages) of the medical institutions output to (displayed on) the website introduction information screen of FIG. 15, emits a message indicating a desired medical institution, or determines the website (homepage) of the desired medical institution by the remote controller, the controller (cloud server 36 or physical server) logs in to the server of the designated (selected) medical institution, outputs the website (homepage) of the designated (selected) medical institution to the front panel 11 (website output means), and a telemedicine procedure is started. When the predetermined procedure is completed, the telemedicine is started. When the telemedicine is started, the controller (cloud server 36 or physical server) captures the user using the digital camera 24 (image capturing means), and transmits the image data of the user captured by the capturing means to the server (another server) of the medical institution using the Internet (communication means) (image data transmission means). Although not illustrated, the image (video or 3D image) of the user is output to (displayed on) the display connected to the server of the medical institution.

The controller (cloud server 36 or physical server) receives the image data of a doctor (third party) who faces the user via the display device 10A from the server of the medical institution (another server) using the Internet (communication means) (image data reception means), and outputs (displays) the image (vide or 3D image) of the doctor (third party) received by the image data reception means to the front panel 17 of the display device 10A (image data output means). The telemedicine screen illustrated in FIG. 16 is output to (displayed on) the front panel 17, and the telemedicine is started. On the telemedicine screen of FIG. 16, a doctor video output area 16a that outputs (displays) a video of a doctor of the medical institution, a comment output area 16b that outputs (displays) a comment of the doctor during medical examination, an OFF button 16c, and a menu button 16d are output (displayed).

The controller (cloud server 36 or physical server) continuously outputs (displays) the video of the doctor on the front panel 17 of the display device 10A, collects the voice of the user using the microphone 25 (voice collection means), and transmits the audio data of the user collected by the voice collection means to the server of the medical institution (another server) using the Internet (communication means) (audio data transmission means). The controller (the cloud server 36 or the physical server) receives audio data of the doctor (the third party) interacting with the user via the display device 10A from another server using the Internet (the communication means) (the audio data reception means), and emits (outputs) the voice of the doctor (the third party) received by the audio data reception means using the speaker 29 (the voice output means).

In telemedicine, the display device 10A and the server of the medical institution are connected via the Internet (communication means), and face-to-face medical care using image and voice is performed between the user and the doctor of the medical institution. Note that the display device 10A (including display device 10B) can perform not only telemedicine but also any action performed online, such as an online lesson, an online seminar, online English conversation, or an online class (cooking class, tea ceremony class, flower arranging class, handwriting class, fitness class, or the like). In addition, the display device 10A (including display device 10B) can output (display) any website corresponding to the request of the user.

The display device 10A (including display device 10B) outputs (displays), on the front panel 17, the website introduction information of a plurality of various types of websites corresponding to the request emitted by the user, so that the website introduction information required by the user can be output to (displayed on) the front panel 17 only by voice, and the designated website can be output to (displayed on) the front panel 17. By checking the desired website required by voice, the user can obtain various types of information useful for the user.

Figure 17:
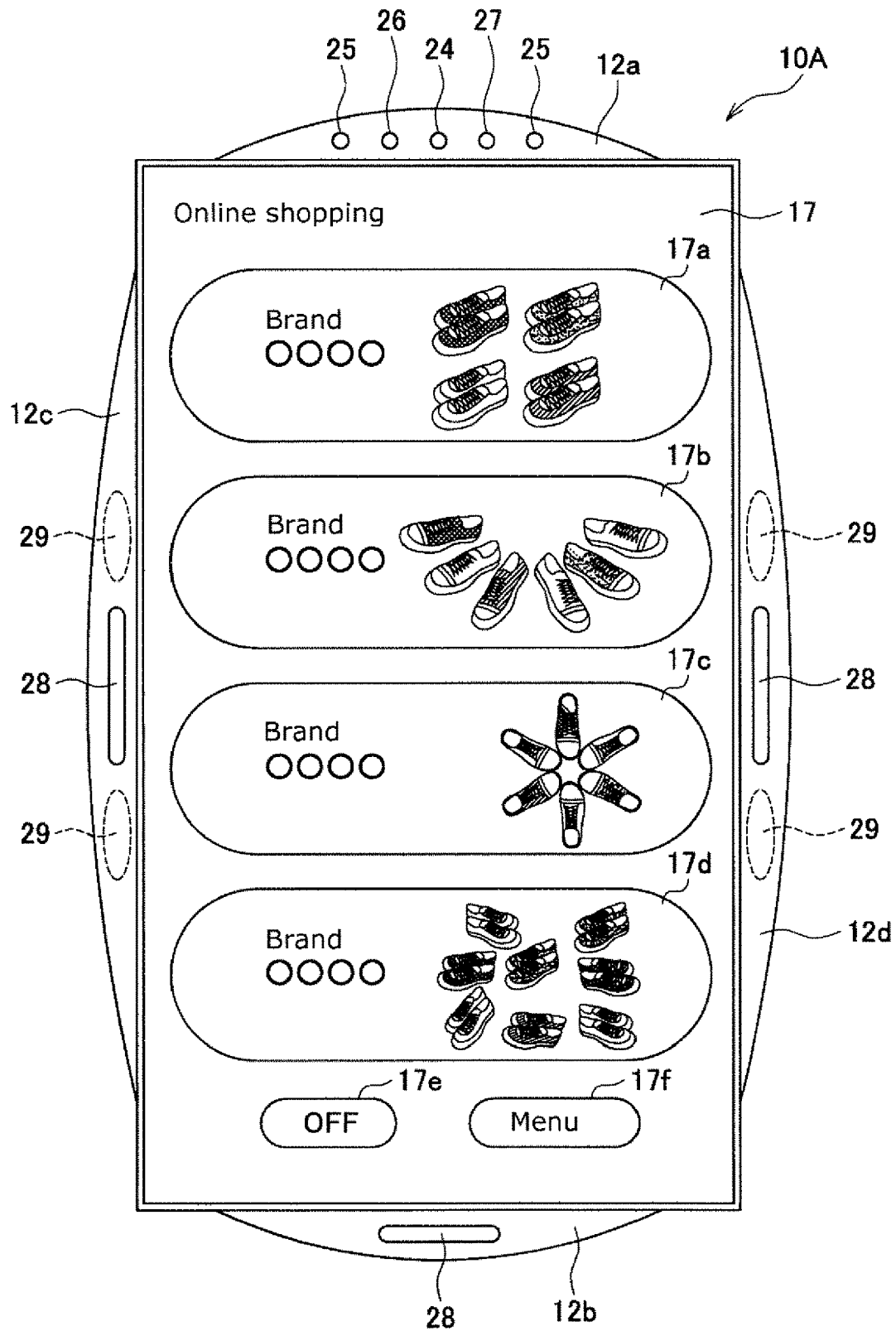
FIG. 17 is a diagram illustrating an example of a request-related site introduction information screen output to the front panel of the display device.

FIG. 17 is a diagram illustrating an example of a request-related site introduction information screen output to the front panel 17 of the display device 10A. In FIG. 17, the support rod 38 and the stand 39 are not illustrated. Hereinafter, the output of a request will be described by exemplifying the display device 10A, but the output of the request by the display device 10B is also the same as that of the display device 10A.

In order for the user to view the related information (related data) related to the request, the user taps the request display icon 14b on the menu screen of FIG. 14, emits a message indicating the request display icon 14b, or determines the request display icon 14b by the remote controller. When the request display icon 14b is tapped, emitted (collected by the voice collection means), or determined, the request input screen is output (displayed) on the front panel 17 of the display body 11, which is not illustrated. On the request input screen, a request input area for inputting a request (keyword), a request determination button, a clear button, and an OFF button are output (displayed).

After inputting a predetermined request in the request input area, the user taps the request determination button. Alternatively, a message indicating the predetermined request is emitted. The request message emitted by the user is collected by the microphone 25, and an electrical signal of the request (keyword) is transmitted to the controller (voice collection means). Note that the request is assumed to be "sneaker shopping" or "buy sneaker". When the request determination button is tapped or an electrical signal of the request is transmitted, the controller (cloud server 36 or physical server) receives a plurality of various types of request-related sites (various types of request-related data related to request with request as keyword) corresponding to the request with the request as a keyword from servers (other servers) of various types of sneaker manufacturers using the Internet (communication means) (request-related data reception means), and outputs (displays), on the front panel 17, introduction information of the sites of the various types of sneaker manufacturers (introduction information of the various types of request-related sites) received from the servers of the sneaker manufacturers (other servers) by the request-related data reception (request-related site introduction information output means).

In the request-related site introduction information output means, the controller (cloud server 36 or physical server) outputs (displays) the request-related site introduction information screen illustrated in FIG. 17 to the front panel 17. On the request-related site introduction information screen of FIG. 17, website output areas 17a to 17d that output (display) websites (homepages) of a plurality of various types of sneaker manufacturers in which the user can shop for sneakers, an OFF button 17e, and a menu button 17f are output (displayed). Note that by scrolling the request-related site introduction information screen in the vertical direction, it is possible to display websites (homepages) of other various types of sneaker manufacturers.

When the user taps (selects) a desired one from the websites (homepages) of the sneaker manufacturers output to (displayed on) the request-related site introduction information screen of FIG. 17, emits a message indicating a desired sneaker manufacturer, or determines the website (homepage) of the desired sneaker manufacturer by the remote controller, the controller (cloud server 36 or physical server) logs in to the server of the designated (selected) sneaker manufacturer, and outputs the website (homepage) of the designated (selected) sneaker manufacturer (request-related data received by request-related data reception means) to the front panel 17 (request-related data output means). The user performs online shopping on the website (homepage) of the sneaker manufacturer. Note that the display device 10A (including display device 10B) can receive various types of request-related information related to (corresponding to) not only online shopping but also all other requests from another server, and output (display) the received request-related information to the front panel 17.

The display device 10A (including display device 10B) outputs (displays), on the front panel 17, various types of request-related information related to the request emitted (or input) by the user, so that various types of request-related information required by the user can be output to (displayed on) the front panel 17 only by voice (or input), and the user can obtain various types of information useful for the user by checking the desired request-related information required by voice (or input).

Figure 18:
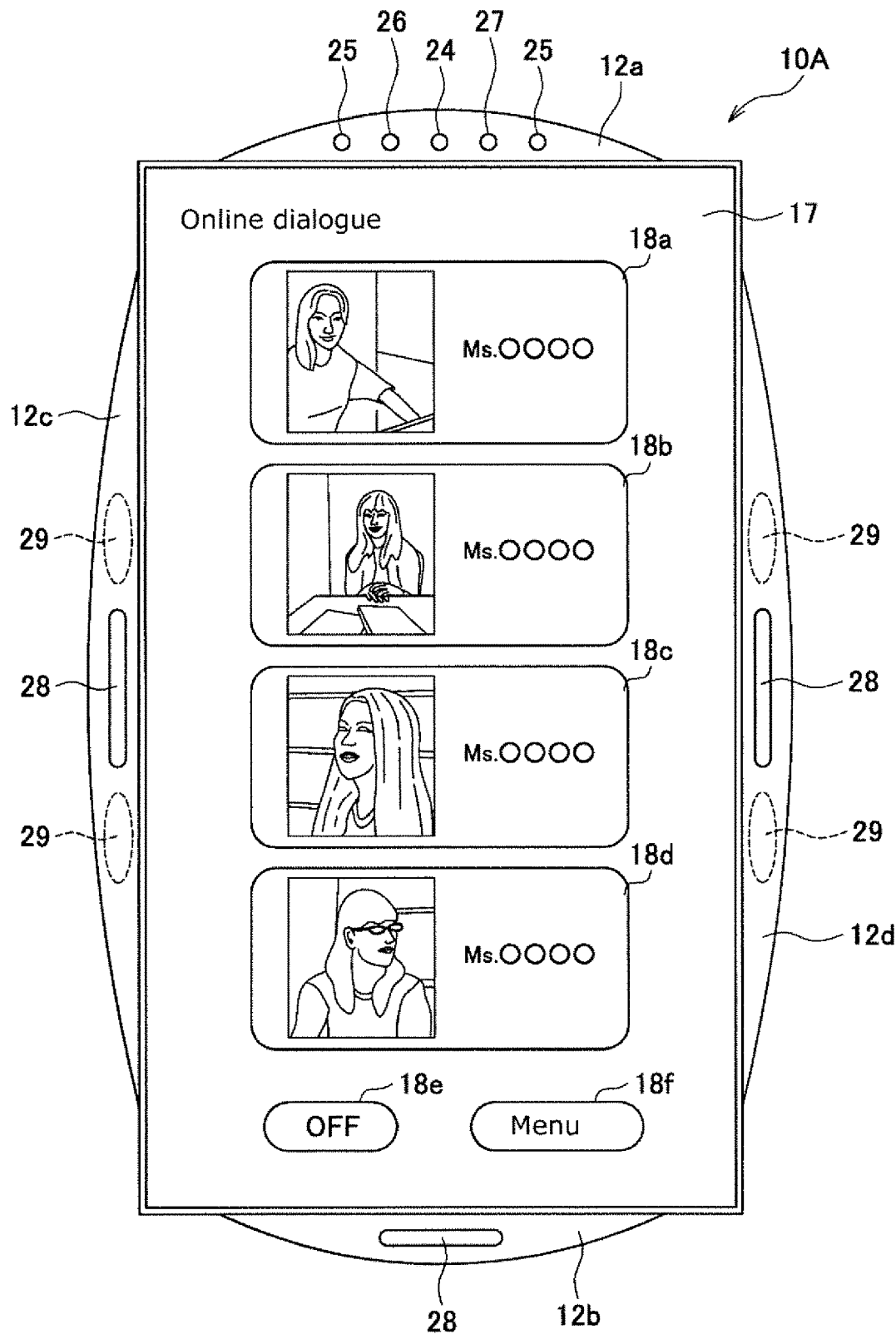
FIG. 18 is a diagram illustrating an example of foreign person introduction information output to the front panel of the display device.
Figure 19:
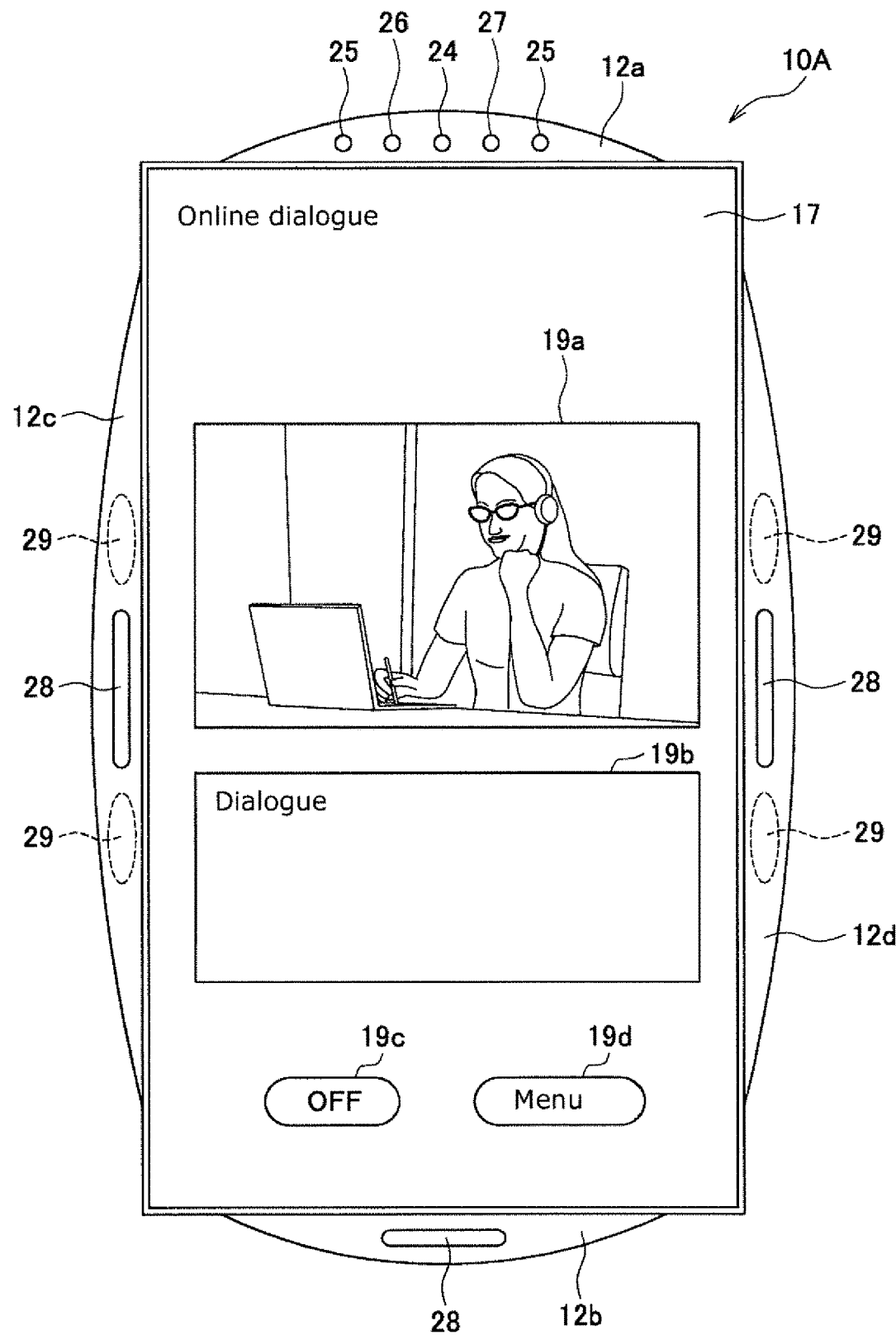
FIG. 19 is a diagram illustrating an example of an online interaction screen output to the front panel of the display device.

FIG. 18 is a diagram illustrating an example of a foreign person introduction screen output to the front panel 17 of the display device 10A, and FIG. 19 is a diagram illustrating an example of an online interaction screen output to the front panel 17 of the display device 10A. In FIGS. 18 and 19, the support rod 37 and the stand 39 are not illustrated. Hereinafter, the online interaction will be described by exemplifying the display device 10A, but the online interaction by the display device 10B is also the same as that of the display device 10A.

In a case where the user desires translation, the translation icon 14d on the menu screen of FIG. 14 is tapped, a message indicating the translation icon 14d is emitted, or the translation icon 14d is determined by the remote controller. When the translation icon 14c is tapped, emitted (collected by voice collection means), or determined, a translation request input screen is output to (displayed on) the front panel 17 of the display body 11, which is not illustrated. On the translation request input screen, a translation request input area for inputting a translation request (keyword), a translation request determination button, a clear button, and an OFF button are output (displayed).

After inputting a predetermined translation request in the translation request input area, the user taps the translation request determination button. Alternatively, a message indicating the predetermined translation request is emitted. The translation request message emitted by the user is collected by the microphone 25, and an electrical signal of the translation request (keyword) is transmitted to the controller (voice collection means). Note that the translation request is assumed to be "translation into English". When the translation request determination button is tapped or an electrical signal of the translation request is transmitted, the controller (cloud server 36 or physical server) outputs (displays), on the front panel 17, a Japanese to English translation screen (not illustrated) corresponding to the translation request with the translation request as a keyword.

The user emits a word to be translated to the Japanese to English translation screen, or inputs a word to be translated to the text input area of the Japanese to English translation screen, and taps the translation button. When the translation button is tapped, the controller (cloud server or physical server) translates Japanese into English using a translation application (translation means), and outputs (displays) the translated English on the Japanese to English translation screen.

Furthermore, when the translation request is "interaction with foreign person" or "conversation with foreign friend", and the translation request determination button is tapped, or an electrical signal of the translation request is transmitted, the controller (cloud server 36 or physical server) receives a plurality of various types of foreign persons capable of interacting (including URLs (contacts) of foreign persons (third parties)) corresponding to the translation request with the translation request as a keyword from another server using the Internet (communication means) (foreign person introduction information reception means), and outputs (displays), on the front panel 17, introduction information (URLs) of the plurality of various types of foreign persons (the third parties) received from another server by the foreign person introduction information reception means (foreign person introduction information output means).

In the foreign person introduction information output means, the controller (cloud server 36 or physical server) outputs (displays) the foreign person introduction information screen illustrated in FIG. 18 to the front panel 17, On the foreign person introduction information screen of FIG. 18, foreign person output areas 18a to 18d that output (display) a plurality of foreign persons (third parties) who can have an interaction with the user, an OFF button 18e, and a menu button 18f are output (displayed). Note that it is possible to display a plurality of other foreign persons (third parties) by scrolling the foreign person introduction information screen in the vertical direction.

When the user taps (selects) a foreign person (URL) with whom the user desires to have an interaction from the foreign persons output to (displayed on) the foreign person output areas 18a to 18d on the foreign person introduction information screen of FIG. 18, emits a message indicating the foreign person with whom the user desires to have an interaction, or determines the foreign person with whom the user desires to have an interaction by the remote controller, the controller (cloud server 36 or physical server) logs in the server of the designated (selected) foreign person to have an interaction with and outputs the image of the designated (selected) foreign person to the front panel 17 (foreign person output means), and the interaction with the foreign person is started. When the interaction is started, the controller (cloud server 36 or physical server) captures the user using the digital camera 24 (image capturing means), and transmits the image data of the user captured by the capturing means to the server (another server) of the foreign person to have an interaction with using the Internet (communication means) (image data transmission means). Although not illustrated, the image (video or 3D image) of the user is output to (displayed on) the display connected to the server of the foreign person to have an interaction with.

The controller (cloud server 36 or physical server) receives image data of a foreign person (third party) who faces the user via the display device 10A from the server of the foreign person (another server) using the Internet (communication means) (image data reception means), and outputs (displays) the image (vide or 3D image) of the foreign person (third party) received by the image data reception means to the front panel 17 of the display device 10A (image data output means). The online interaction screen illustrated in FIG. 19 is output to (displayed on) the front panel 17, and the interaction is started. On the online interaction screen of FIG. 19, a foreign person video output area 19a that outputs (displays) a video of a foreign person to have an interaction with, a conversation output area 19b that outputs (displays) conversation with the foreign person during the interaction, an OFF button 19c, and a menu button 19d are output (displayed).

The controller (cloud server 36 or physical server) continuously outputs (displays) the video of the foreign person on the front panel 17 of the display device 10A, collects the voice of the user using the microphone 25 (voice collection means), and translates the audio data of the user collected by the voice collection means into a language audible to the foreign person to have an interaction with using the translation application (translation means). The controller (cloud server 36 or physical server) transmits the audio data of the user translated by the translation means to the server of the foreign person (another server) using the Internet (communication means) (audio data transmission means). The translated voice of the user is output (emitted) from a speaker connected to the server of the foreign person.

The controller (cloud server 36 or physical server) receives the audio data of the foreign person (third party) having an interaction with the user via the display device 10A from another server using the Internet (communication means) (audio data reception means), and translates the voice of the foreign person received by the audio data reception means into a language audible to the user using the translation application (translation means). The controller (cloud server 36 or physical server) outputs (emits) the voice of the foreign person translated by the translation means using the speaker 29 (voice output means). Note that, in the conversation output area 19b, the voice of the user translated into a foreign language is output (displayed) in time series, and translated voice of the foreign person is output (displayed) in time series.

In the online interaction, the display device 10A and the server of the foreign person are connected via the Internet (communication means), face-to-face interaction using an image and voice is performed between the user and the foreign person, and the conversation is translated into a language that can be understood by both of the user and the foreign person by the translation means. Note that the display device 10A (including display device 10B) translates not only the online interaction but also any foreign information into a language that can be understood by the user by the translation means. The display device 10A (including display device 10B) translates the voice of the user and the voice of the foreign person (third party) into a predetermined language, and outputs the translated voice of the user and the translated voice of the foreign person using the speaker 29. Therefore, it is possible to communicate with a foreign person in a country different in language through interaction, to convey various types of useful information to the foreign person in another country, and to obtain various types of useful information from the foreign person in another country.

Figure 20:
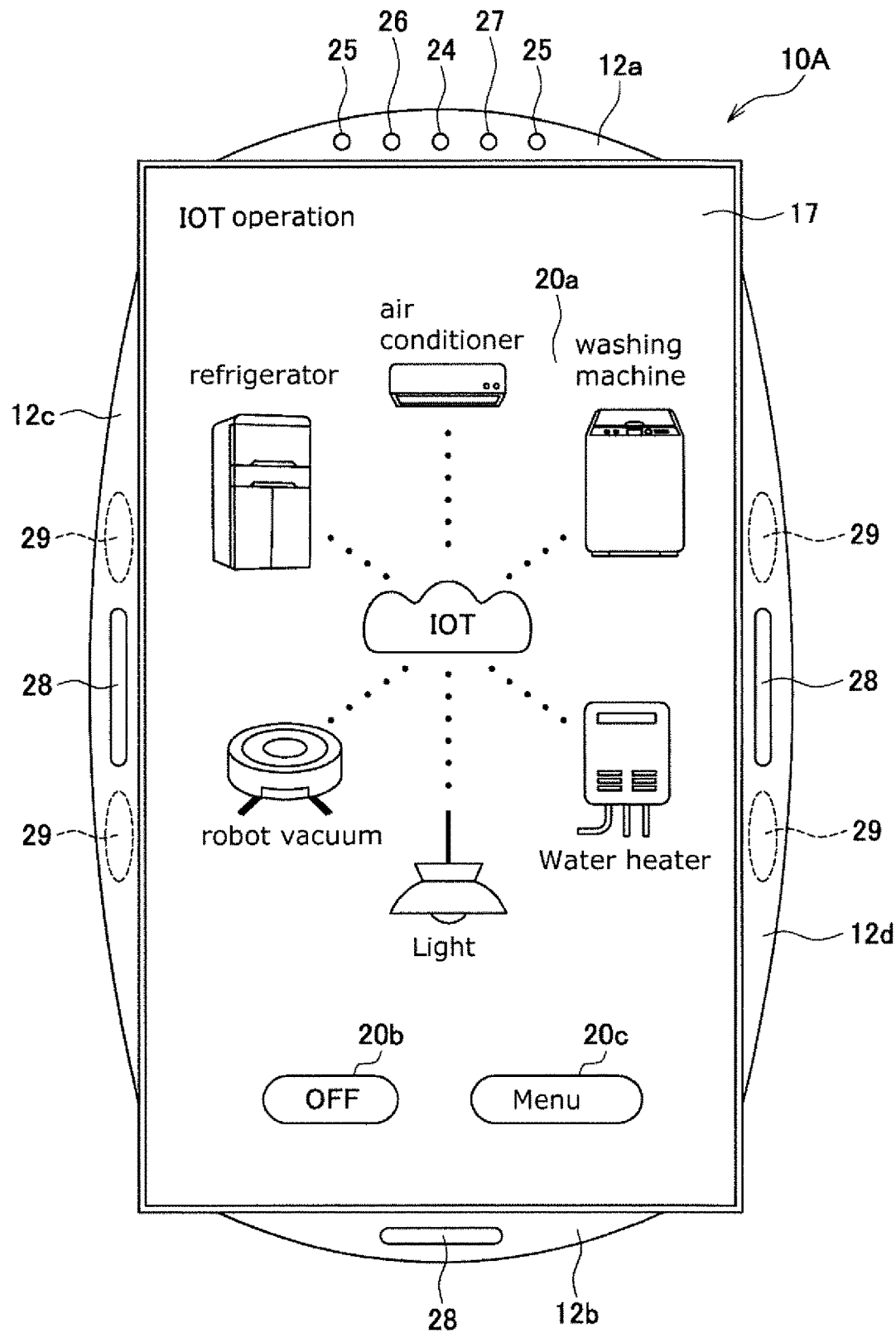
FIG. 20 is a diagram illustrating an example of an IOT target device selection screen output to the front panel of the display device.

FIG. 20 is a diagram illustrating an example of an IOT target device selection screen output to the front panel 17 of the display device 10A. In FIG. 20, the support rod 37 and the stand 39 are not illustrated. Hereinafter, the operation of an electrical appliance by an Internet of Things (IOT) will be described by exemplifying the display device 10A, but the operation of the electrical appliance by the IOT in the display device 10B is also the same as that of the display device 10A.

In a case where the user desires to operate the electrical appliance by the IOT, the IOT icon 14c on the menu screen of FIG. 14 is tapped, a message (for example, IOT) indicating the IOT icon 14c is emitted, or the IOT icon 14c is determined by the remote controller. When the IOT icon 14c is tapped, emitted (collected by the voice collection means) or determined, the controller (the cloud server 36 or the physical server) outputs (displays) the IOT target device selection screen illustrated in FIG. 20 to the front panel 17 of the display body 11.

On the IOT target device selection screen of FIG. 20, an IOT target device output area 20a that outputs (displays) an IOT target device, an OFF button 20b, and a menu button 20c are output (displayed). In the IOT target device output area 20a, a refrigerator, an air conditioner, a washing machine, a water heater, a lighting fixture, and a cleaning robot are output (displayed) as target devices (electrical appliances), but the target devices (electrical appliances) are not limited to those illustrated, and the target device (electrical appliance) includes all electrical devices that can be operated by the IOT.

The user taps an electrical appliance (target device) to be operated by the IOT from the IOT target device output area 20a, emits a message (for example, refrigerator, air conditioner, or the like) indicating the IOT target device, or determines the IOT target device by the remote controller. When the electrical appliance (target device) is tapped, emitted (collected by voice collection means), or determined, the electrical apparatus identification information of the electrical appliance tapped, emitted, or determined is transmitted from the controller to the cloud server 36 (or physical server). The cloud server 36 (or physical server) identifies the IOT target device using the electrical apparatus identification information, and selects a process (job) to be instructed to the identified IOT target device. The cloud server 36 (or physical server) transmits the selected process to the electrical appliance (target device) using the Internet, and causes the electrical appliance to perform the selected process (process performance means). The electrical appliance performs each process transmitted from the cloud server 36 (or physical server) via the Internet.

Processes to be performed by the refrigerator based on the IOT include door opening and closing management, safety confirmation of a family based on opening and closing of a door, a message function of emitting a message from the refrigerator, remote control of the temperature of the refrigerator, and the like. Process to be performed by the air conditioner based on the IOT include remote control of on and off of the switch of the air conditioner, remote control of a wind speed and a temperature, timer setting by remote control, mode switching by remote control, and the like. Processes to be performed by the washing machine based on the IOT include remote control of on and off of the switch of the washing machine, setting of a course suitable for laundry, check of a washing status, and the like. Process to be performed by the water heater based on the IOT include remote control of on and off of the switch of the water heater, remote control of a temperature, remote control of the amount of water, and the like. Process to be performed by the lighting fixture based on the IOT include remote control of on and off of the switch of the lighting fixture, remote control of the brightness of the lighting fixture, dimming of the lighting fixture, and the like. Process to be performed by the cleaning robot based on the IOT include remote control of on and off of the switch of the cleaning robot, remote control of output of the cleaning robot, and the like.

Since the display device 10A (including display device 10B) causes an electrical apparatus (refrigerator, air conditioner, washing machine, water heater, lighting fixture, or cleaning robot) to perform a predetermined process corresponding to a command by the IOT, various types of processes desired by the user can be performed by the electrical apparatus via the IOT, and the electrical apparatus can be operated by remote control using the IOT.

REFERENCE SIGNS LIST

10A display device (display system)
10B display device (display system)
11 display body
12a to 12d first to fourth extension members (first to fourth extension portions)
13 first end edge
14 second end edge
15 first side edge
16 second side edge
17 front panel
18 back surface area
19a to 19d first to fourth inner peripheral edges
20a to 20d first to fourth outer peripheral edges
21 front opening
22 cloth
23a to 23d first to fourth mounting plates
24 digital camera (camera)
25 microphone
26 human sensor
27 light detection sensor
28 LED lamp 29 speaker
30a to 30d first to fourth virtual intersecting peripheral edges
31a to 31d first to fourth intersection corners
32a to 32d first to fourth extension members (first to fourth extension portions)
33a to 33d first to fourth mounting plates
34a to 34d first to fourth intersecting peripheral edges
35a to 35d first to fourth corners
36 cloud server
37 support rod
38 leg
39 stand

The invention claimed is:

1. A display device that includes first and second end edges extending in one direction in parallel with each other, first and second side edges extending in an intersecting direction intersecting the one direction in parallel with each other, and a front panel and a back surface area surrounded by the end edges and the side edges, that is molded into a rectangle with a predetermined area long in the one direction or the intersecting direction, and outputs a predetermined image to the front panel, the display device comprising: a first extension portion with a predetermined area including a first outer peripheral edge defining an arc so as to project radially outward from the first end edge; a second extension portion with a predetermined area including a second outer peripheral edge defining an arc so as to project radially outward from the second end edge; a third extension portion with a predetermined area including a third outer peripheral edge defining an arc so as to project radially outward from the first side edge; a fourth extension portion with a predetermined area including a fourth outer peripheral edge defining an arc so as to project radially outward from the second side edge; and a camera that captures an object facing the front panel and is installed in at least one of the first to fourth extension portions, the display device further comprising: a communication means capable of transmitting and receiving predetermined data to and from another server using a predetermined network; an image capturing means that captures the object using the camera; an image data transmission means that transmits image data of an object captured by the capturing means to another server using the communication means; an image data reception means that receives image data of an object facing the user via the display device from the another server using the communication means; and an image data output means that outputs an image of an object received by the image data reception means to the front panel, and the display device further comprising a support rod installed in the back surface area and extending in a vertical direction, wherein the display device is capable of moving upward and downward in the vertical direction along the support rod, capable of rotating in a clockwise direction and a counterclockwise direction about the support rod, and capable of turning in a clockwise direction and a semi-clockwise direction about a central portion of the display device, and the display device further comprising: an adaptability estimation means that, by inputting image data of a face of the user captured by the image capturing means to a learned learning model that has performed machine learning for estimating a degree of adaptability of a face posture of the user visually recognizing the front panel, acquires an adaptability score indicating the degree of adaptability of the face posture of the user visually recognizing the front panel from the learned learning model; and a display movable means that automatically moves up and down, rotates, or turns the display device in such a manner that the adaptability score acquired by the adaptability estimation means satisfies a predetermined condition.

2. The display device according to claim 1, wherein an object captured by the camera is a user of the display device, an object facing the user via the display device is a third party interacting with the user via the display device, the capturing means captures the user using the camera, the image data transmission means transmits image data of the user captured by the capturing means to another server using the communication means, the image data reception means receives image data of the third party from the another server using the communication means, and the image data output means outputs an image of the third party received by the image data reception means to the front panel.

3. The display device according to claim 2, further comprising: a microphone that collects voice of a user facing a front panel of the display and is installed in at least one of the first to fourth extension portions; a speaker that emits a predetermined sound and is installed in at least one of the first to fourth extension portions; a voice collection means that collects voice of the user using the microphone; an audio data transmission means that transmits audio data of the user collected by the voice collection means to another server using the communication means; an audio data reception means that receives audio data of a third party interacting with the user via the display device from the another server using the communication means; and a voice output means that outputs voice of the third party received by the audio data reception means using the speaker.

4. The display device according to claim 3, further comprising: a website introduction information reception means that, in a case where a request emitted by the user is collected by the voice collection means, receives website introduction information of a plurality of various types of websites corresponding to the request with the request as a keyword from another server using the communication means; a website introduction information output means that outputs website introduction information received by the website introduction information reception means to the front panel; and a website output means that, when a predetermined website is designated from a plurality of various types of websites output by the website introduction information output means, outputs a designated website to the front panel.

5. The display device according to claim 3, further comprising: a request-related information reception means that, in a case where a request emitted by the user is collected by the voice collection means, receives various types of request-related information related to the request with the request as a keyword from another server using the communication means; and a request-related information output means that outputs request-related information received by the request-related information reception means to the front panel.

6. The display device according to claim 1, further comprising: a translation means that translates voice emitted by the user and voice of a third party received from another server into a predetermined language; and a translated voice output means that outputs the voice of the user and the voice of the third party translated by the translation means using the speaker.

7. The display device according to claim 3, further comprising a process performance means that, in a case where the user inputs, via the display device, a command to cause a predetermined electrical apparatus to perform a predetermined process by an Internet of Things (IOT), transmits a predetermined process corresponding to the command to the electrical apparatus using the communication means, and causes the electrical apparatus to perform the predetermined process.

8. The display device according to claim 1, further comprising: a human sensor that detects a person when the person is positioned in front of the front panel and is installed in at least one of the first to fourth extension portions; a display first activation means that activates the display device in a case where the human sensor detects the person; and a display first stop means that stops the display device activated in a case where the human sensor detects the person and then the person is no longer detected.

9. The display device according to claim 8, further comprising an image data first comparison means that, after the display device is activated by the display first activation means, captures a person positioned in front of the front panel by the capturing means and compares image data of a captured person with image data of the user stored in advance, wherein in a case where an image of the captured person is different from an image of the user stored as a result of comparing the image of the captured person with the image of the user stored by the image data first comparison means, the display first stop means is implemented.

10. The display device according to claim 3, further comprising: a voice first comparison means that, in a case where an activation message emitted by the user is collected by the voice collection means, compares voice of the activation message collected of the user with voice of the user stored in advance; a display second activation means that activates the display device in a case where the voice of the activation message is same as the voice of the user stored as a result of comparing the voice of the activation message with the voice of the user stored by the voice first comparison means; and a display second stop means that stops the display device activated in a case where a stop message emitted by the user is collected by the voice collection means.

11. The display device according to claim 8, further comprising: an illumination lamp that illuminates front of the front panel and is installed in at least one of the first to fourth extension portions; a light detection sensor that detects light around the display device and is installed in at least one of the first to fourth extension portions; an illumination-lamp first activation means that, in a case where the human sensor detects the person and the light detection sensor does not sense light around the display device, activates the illumination lamp; and an illumination-lamp first turn-off means that, in a case where the human sensor does not detect the person or the light detection sensor detects light around the display device, turns off the illumination lamp activated.

12. The display device according to claim 11, further comprising an image data second comparison means that, after the illumination lamp is activated by the illumination-lamp first activation means, captures a person positioned in front of the front panel by the capturing means and compares image data of a captured person with image data of the user stored in advance, wherein in a case where an image of the captured person is different from the image of the user stored as a result of comparing the image of the captured person with the image of the user stored by the image data second comparison means, the illumination-lamp first stop means is implemented.

13. The display device according to claim 11, further comprising: a voice second comparison means that, in a case where an illumination-lamp activation message emitted by the user is collected by the voice collection means, compares voice of the illumination-lamp activation message collected of the user with voice of the user stored in advance; an illumination-lamp second activation means that activates the illumination lamp in a case where the voice of the illumination-lamp activation message is same as the voice of the user stored as a result of comparing the voice of the illumination-lamp activation message with the voice of the user stored by the voice second comparison means; and an illumination-lamp second turn-off means that turns off the illumination lam activated in a case where an illumination-lamp stop message emitted by the user is collected by the voice collection means.

* * * * *